United States Patent
Karlsson et al.

(10) Patent No.: US 12,543,011 B2
(45) Date of Patent: Feb. 3, 2026

(54) ERROR CORRECTION OF HEAD-RELATED FILTERS

(71) Applicant: Telefonaktiebolaget LM Ericsson (publ), Stockholm (SE)

(72) Inventors: Erlendur Karlsson, Uppsala (SE); Mengqiu Zhang, Stockholm (SE); Tomas Jansson Toftgård, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 202 days.

(21) Appl. No.: 18/287,804

(22) PCT Filed: Apr. 23, 2021

(86) PCT No.: PCT/EP2021/060722
§ 371 (c)(1),
(2) Date: Oct. 20, 2023

(87) PCT Pub. No.: WO2022/223132
PCT Pub. Date: Oct. 27, 2022

(65) Prior Publication Data
US 2024/0196151 A1 Jun. 13, 2024

(51) Int. Cl.
*H04S 7/00* (2006.01)

(52) U.S. Cl.
CPC .......... *H04S 7/302* (2013.01); *H04S 2400/11* (2013.01); *H04S 2420/01* (2013.01)

(58) Field of Classification Search
CPC ... H04S 7/302; H04S 2400/11; H04S 2420/01
(Continued)

(56) References Cited

U.S. PATENT DOCUMENTS

| 5,325,436 A | * | 6/1994 | Soli ........................ H04R 5/027 381/26 |
| 5,928,311 A | | 7/1999 | Leavy et al. |

(Continued)

FOREIGN PATENT DOCUMENTS

| EP | 3369260 B1 * | 6/2021 | ............. H04S 7/302 |
| EP | 3375207 B1 * | 6/2021 | ............. H04S 1/005 |

(Continued)

OTHER PUBLICATIONS

International Search Report and Written Opinion dated Feb. 8, 2022 issued in International Patent Application No. PCT/EP2021/060722 (9 pages).

*Primary Examiner* — David L Ton
(74) *Attorney, Agent, or Firm* — Rothwell, Figg, Ernst & Manbeck, P.C.

(57) ABSTRACT

A method for generating a final corrected head-related (HR) filter dataset, (A). The method includes obtaining a first corrected HR filter dataset, (B). Obtaining the first corrected HR filter dataset (B) includes: obtaining (s802) an initial HR filter dataset, (C); obtaining (s804) an extracted HR filter dataset, (D), extracted from the initial HR filter dataset, (C); obtaining (s806) a model, (E), of the extracted HR filter dataset, (D); generating (s808) a modelled HR filter dataset, (F), using the model, (E); selecting (s810) for correction one or more HR filters that are included in the initial HR filter dataset, (C), based on the modelled HR filter dataset, (F), and the extracted HR filter dataset, (D); and generating (s812) the first corrected HR filter dataset, (B) by correcting the selected one or more HR filters. Either the final corrected HR filter dataset (A) is the first corrected HR filter dataset (B) or the method further comprises generating the final corrected HR filter set (A) using the first corrected HR filter dataset (B).

23 Claims, 9 Drawing Sheets

(58) Field of Classification Search
USPC .......................................................... 381/303
See application file for complete search history.

(56) References Cited

U.S. PATENT DOCUMENTS

| | | | |
|---|---|---|---|
| 7,231,054 B1 | 6/2007 | Jot et al. | |
| 8,638,946 B1 * | 1/2014 | Mahabub | H04R 5/00 |
| | | | 381/1 |
| 11,146,908 B2 * | 10/2021 | Mohapatra | G06F 3/04883 |
| 2015/0010160 A1 | 1/2015 | Udesen | |
| 2019/0200159 A1 | 6/2019 | Park et al. | |
| 2020/0245091 A1 | 7/2020 | Alon et al. | |

FOREIGN PATENT DOCUMENTS

| | | |
|---|---|---|
| JP | 2015-19360 A | 1/2015 |
| JP | 2019-115042 A | 7/2019 |
| WO | 2021/074294 A1 | 4/2021 |

\* cited by examiner

600

| |
|---|
| Input<br>Original HR filter dataset $\mathcal{H}_0$<br>Filter extraction specification $X$<br>Output specification $O$ |
| INITIALIZATION ~502<br>Initialization of all data variables. This includes initialization of:<br>Initial HR filter dataset $\mathcal{H}_I$ from $\mathcal{H}_0$ and $X$<br>Error threshold $\mathcal{T}_\varepsilon$, Iteration condition $\mathcal{C}_I$, List of classifiers $\mathcal{L}_{Classifiers}$ |
| Iteration Loop ~504<br>While iteration condition $\mathcal{C}_I$ is true:     512 | s602 — Modeling
Obtain extracted HR filter set $\mathcal{H}_X$ from initial HR filter dataset $\mathcal{H}_I$ s604 — Obtain model $\mathcal{M}_X$ of extracted HR filter dataset $\mathcal{H}_X$ s606 — Obtain HR filter dataset $\mathcal{H}_M$ generated from model $\mathcal{M}_X$     514

Model Error Detection and Classification s608 — Obtain a list of indexes of filters to classify $\mathcal{L}^I_{ToClassify}$ s610 — Obtain list of classified filters $\mathcal{L}^h_{Classified}$     516

HR Filter Dataset Error Correction
Obtain corrected iterated HR filter dataset $\mathcal{H}'_I$

Output ~506
Output according to the output specification $O$
(1) final corrected HR filter dataset $\mathcal{H}_{fc}$, or
(2) Model $\mathcal{M}'_X$ of extracted HR filter dataset $\mathcal{H}'_X$, extracted from $\mathcal{H}_{fc}$, or
(3) A new HR filter dataset generated from model $\mathcal{M}'_X$ in (2) at the elevation and azimuth angles $\theta, \phi$ specified in the output specification $O$

FIG. 6

ERROR CORRECTION OF HEAD-RELATED FILTERS

CROSS REFERENCE TO RELATED APPLICATIONS

This application is a 35 U.S.C. § 371 National Stage of International Patent Application No. PCT/EP2021/060722, filed 2021 Apr. 23.

TECHNICAL FIELD

Disclosed are embodiments related to error correction of head-related (HR) filters.

BACKGROUND

FIG. 1 illustrates a sound wave propagating towards a listener from a direction of arrival (DOA) specified by a pair of elevation and azimuth angles in the spherical coordinate system. The sound wave interacts with the listener's upper torso, head, outer ears, and the surrounding matter before reaching the listener's left and right ear drums. This interaction results in temporal and spectral changes of the waveforms reaching the left and right eardrums, some of which are DOA dependent.

The human auditory system has learned to interpret these changes to infer various spatial characteristics of the sound wave itself as well as the acoustic environment in which the listener finds themselves. This capability is called spatial hearing, which concerns how humans evaluate spatial cues embedded in the binaural signal, i.e., the sound signals in the right and the left ear canals, to infer the location of an auditory event elicited by a sound event (a physical sound source) and acoustic characteristics caused by the physical environment (e.g., small room, tiled bathroom, auditorium, cave) the humans are in. This human capability of spatial hearing, can in turn be exploited to create a virtual spatial audio scene by reintroducing the spatial cues in a binaural signal that would lead to a particular spatial perception of a sound.

The main spatial cues include: 1) angular-related cues: binaural cues, i.e., the interaural level difference (ILD) and the interaural time difference (ITD), and monaural (or spectral) cues; and 2) distance-related cues: intensity and direct-to-reverberant (D/R) energy ratio. Mathematical representation of the short time DOA dependent temporal and spectral changes (e.g., 1-5 msec) of the waveform are the so-called head-related (HR) filters. The frequency domain (FD) representations of those filters are the so-called head-related transfer functions (HRTFs) and the time domain (TD) representations of the filters are the head-related impulse responses (HRIRs).

FIG. 2 illustrates an example of ITD and spectral cues of a sound wave propagating towards a listener. The two plots show the magnitude responses of a pair of HR filters obtained at an elevation of 0 degrees and an azimuth of 40 degrees (The data is from CIPIC database: subject-ID 28. The database is publicly available and can be accessed from the link https://www.ece.ucdavis.edu/cipic/spatial-sound/hrtf-data/). An HR filter based binaural rendering approach has been gradually established, where a spatial audio scene is generated by directly filtering audio source signals with a pair of HR filters of desired locations. This approach is particularly attractive for many emerging applications, e.g., extended reality, which includes virtual reality (VR), augmented reality (AR), and mixed reality (MR), and mobile communication systems, where headsets are commonly used.

An HR filter dataset, sometimes also referred to as an HR filter database, is a collection of left and right HR filters sampled at specific spherical angles or directions (elevation and azimuth) around a listener and other related metadata, that are often obtained by acoustic measurements. Three steps are involved in obtaining HR filters in an HR filter dataset: binaural recording, reference recording, and post-processing.

Step 1: Binaural Recording

The binaural recording aiming to obtain HR filters is usually conducted in an anechoic chamber. The recording setup consists of a loudspeaker system, an in-ear binaural microphone system, a mechanical system for loudspeaker positioning and listener positioning, and some auxiliary devices and software.

FIG. 3 shows a simplified setup for HR filter binaural recording. A listening subject (e.g., an artificial head, a mannequin, or a human subject) sits at the center of the mechanical system such that the position of the center of the subject's head is at the measurement origin (0, 0, 0). An excitation signal is generated and played back through a sound emitter, e.g., a loudspeaker, which is placed at a position on a spherical surface of constant radius. The position may be denoted by ($\theta$, $\phi$, $r$), where $\theta$ corresponds to elevation, $\phi$ corresponds to azimuth, and $r$ corresponds to radius, which is the distance from the center of the listener's head to the sound emitter. The signals arriving at the two ears are recorded by the in-ear microphones. This measurement is repeated while varying the spatial position of the excitation signal relative to the listener, which is done by varying the position of the listener, the sound emitter, or both in different dimensions. FIG. 4 shows an example of a sampling grid on a sphere, where the dots indicate the positions at which the recordings took place.

Step 2: Reference Recording

The raw binaural recording contains not only HR impulse responses but also impulse responses of the entire recording system including the loudspeaker, the binaural microphones, AD/DA converters, and amplifiers. A reference recording is then carried out separately for each in-ear microphone. The recording protocol is similar to the binaural recording by removing the subject and placing the microphone at the position (0, 0, 0).

Step 3: Post-Processing

Post-Processing: Free Field Equalization

The common procedure to remove the impact of the recording system from the raw binaural recording is the free field equalization. Let $y^{l/r}(t; \theta, \phi, r)$ denote the signal recorded at the left/right in-ear microphone when the excitation signal is emitted at a direction ($\theta$, $\phi$, $r$). Note that the radius $r$ is omitted in the rest of this disclosure for simplicity because $r$ is usually a constant in an HR filter measurement. Let s(t) denote the excitation signal. Then $y^{l/r}(t; \theta, \phi)$ is described as the excitation signal convolved with unknown impulse responses, i.e., $y^{l/r}(t; \theta, \phi) = s(t) * h^{l/r}(t; \theta, \phi) * g^{l/r}(t)$. $h^{l/r}(t; \theta, \phi)$ denotes the left/right ear HR impulse response and $g^{l/r}(t)$ denotes the impulse response of the recording system using the left/right in-ear microphone. Let $x^{l/r}(t)$ be the reference recording, which is $x^{l/r}(t)=s(t)*g^{l/r}(t)$.

A Fourier Transform (FT) is taken of each recording resulting in $Y^{l/r}(f; \theta, \phi)$ and $X^{l/r}(f)$, where $f$ is frequency. The spectral response of the reference recording is factored out from the spectral response of each binaural recording using spectral division with a certain level of regularization, e.g., $$H^{l/r}(f; \theta, \phi) = \frac{Y^{l/r}(f; \theta, \phi)}{X^{l/r}(f) + \lambda},$$

where $\lambda$ is the regularization parameter for avoiding computational noise and it can be frequency dependent. The resulting transfer function $H^{l/r}(f; \theta, \phi)$ is then converted into the time domain, and it is usually truncated to a certain length that covers the acoustic effects of the ear, the head, and the torso.

Post-Processing: Diffuse Field Equalization

Diffuse field equalization attempts to remove all commonality within a set of recordings. This is to normalize the measurements with respect to an average across all directions with a certain level of frequency dependent/independent regularization. Such average could be an average of the magnitude responses across all incident directions, or an average of the magnitude squared responses (a power average) across all directions. One purpose of the diffuse field equalization is to provide a timbral consistency across the HR filters in an HR filter dataset. Another purpose is to compensate for any generic response of windowing or any other unwanted effect from post-processing common for all directions.

Post-Processing: Low-Frequency Compensation

Due to the limited bandwidth of the loudspeakers and the low-frequency limit of the anechoic chamber, frequencies below approximately 200 Hz cannot be reliably measured. In theory, however, the low-frequency response (<200 Hz) should be close to unity or the low-frequency gain should be around 0 dB given that the size of human head is much smaller than the wavelength. Therefore, a low-frequency compensation or correction is often applied to obtain the proper low-frequency response. A low-frequency model may be adopted to extend a flat frequency response and linear phase response, e.g., below 400 Hz. The low-frequency content of the measured data may for example be extrapolated with some numerically simulated data. Clearly, the purpose of the low-frequency compensation is to ensure a natural bass of the binauralized audio.

The estimated HR filters are often provided as finite-impulse response (FIR) filters. Currently, the HR filters are usually used directly in their original form by a binaural audio renderer or a pair of HR filters may be converted to Interaural Transfer Function (ITF) or modified ITF to prevent abrupt spectral peaks. Alternatively, HR filters may be described by a parametric representation. Such parameterized HR filters are easy to integrate with parametric multi-channel audio coders, e.g., Moving Picture Experts Group (MPEG) surround and Spatial Audio Object Coding (SAOC).

The performance of a binaural audio renderer is evaluated subjectively through listening tests, where the judgement is usually an overall assessment of the perceived spatial quality together with the perceived sound quality. If a binauralized audio in the two ear canals of a listener corresponds very well to those that the same listener would have at the place where the sound is picked up by his/her ears, an "authentic" reproduction takes place. To achieve such "authentic" reproduction, "authentic" HR filters are needed.

SUMMARY

Considerable effort has been put into setting up HR filter datasets using measurements on a manikin or head and torso simulator, e.g., KEMAR (Knowles Electronics Mannequin for Acoustics Research), or human subjects. Currently, there are a number of publicly available datasets, and it is common that a set of HR filters selected from a publicly available HR filter dataset is used directly in a binaural audio renderer. Variability, however, is an inherent part of the HR filter measurement process where noise or measurement errors are inevitable. Such measurement errors have strong negative effects on the spatial perception of a binauralized audio, when used directly in binaural audio rendering. Examples of such errors are misalignment errors and errors caused by non-HR reflections.

Misalignment Errors

In HR filter measurement, especially with a human subject, a special chair is used. The special chair is usually designed to have a structure with head rest and back rest, which provides a reference position for the subject's head relative to the speaker with the aim to minimize head movements during measurements. A slight tilt of the subject's head or a slight tilt of the chair's vertical axis of rotation, however, often occurs, thereby causing misalignment of the positions between speaker and head. Such misalignment results in discontinuity of the time of arrival (TOA) of the signal at the eardrum, or in other words, the frequency-independent time delay, named as onset delay, of the HR filter. The discontinuity of onset delay implies discontinuity of ITD. For example, the ITDs of the HR filters at azimuth 0 degree are supposed to be 0. But when the misalignment occurs, the ITDs deviate from 0. For an audio scene with a source moving along a vertical line in front of the listener, instabilities (left/right wobbling) can be perceived for the renderer using the HR filters with this misalignment error even for a deviation as small as ±1 sample. Moreover, discontinuity of phases of adjacent frames caused by the discontinuity of onset delay can be perceived as well.

Rendering a spatial audio source that leads to a convincing spatial perception of a sound at an arbitrary location in space requires a pair of HR filters at the corresponding location, and therefore, a set of HR filters at finely sampled locations on a sphere is needed. The spatial resolution of HR filter sets used in the renderer determines the spatial resolution of rendered sound sources. Using HR filter sets that are coarsely sampled over a 2D sphere, a user of virtual reality (VR), augmented reality (AR), mixed reality (MR), and/or extended reality (XR) usually reports spatial discontinuity of a moving sound. Such spatial discontinuities lead to audio-video sync errors that significantly decrease the sense of immersion.

Obtaining HR filter sets at a denser grid over the sphere may solve the problem. But estimating HR filter sets from input-output measurements on a fine grid that meets the minimum audible angle (MAA) requirement can be very time consuming and tedious for both subjects and experimenters. To improve the rendering without increasing the measurement resolution, angular interpolation techniques may be utilized.

The nearest-neighbor method is one of the approaches that a binaural audio renderer usually takes for HR filter angular interpolation. The method assumes that HR filters at each sampled location influences an area only up to a certain finite distance. In such method, HR filters at unsampled locations are approximated as a weighted average of HR filters at sampled locations within a certain cut-off distance from the unsampled locations, or from a given number of the closest points on a rectilinear two dimensional (2D) grid. This approach is efficient to infer spatial-related information about missing HR filters given a sparsely sampled HR filter dataset. This approach, however, is sensitive to the discontinuity of the onset delay and can lead to a broadened sense of the object location.

Non-HR Reflections

Non-HR reflections are another source causing errors in the HR filter measurement. As discussed above, the HR filter measurement typically takes place in an anechoic chamber. Moreover, the mechanical setup is always carefully designed to have a minimal effect on incident acoustic waves, e.g., the sides of loudspeakers are wrapped in acoustic absorbers, the supporting structure of the chair is covered by acoustic absorbers, and so on. But non-HR reflections may still occur and may be captured in the recording. Such non-HR impulse responses may appear in the resulting HR filter, degrading the authenticity, e.g., destroying the ILD cue at certain frequency bands resulting in a perceivable "auxiliary" source at somewhere other than the desired location.

As discussed above, the original HR filter sets that are available for use in binaural rendering are typically FIR filters. These FIR filters are usually several milliseconds long, where the temporal span of each filter can be divided into three sequential temporal regions, i.e., the pre-active-region, the active-region, and the post-active-region. In the pre- and the post-active-regions, the filter taps are zero or are very close to zero due to estimation noise and contribute very little to the binauralization. The active-region contains the filter taps that stand for actual binauralization. These filter taps are strong in the beginning of the active-region but taper off and decrease to close-to-zero values in the end of the region.

The filters used in binaural audio rendering can be the original filters or be extracted from the original filters over different subregions of the total temporal span of the filters. Ideally it would be beneficial to extract only the active-region of the filters and estimate the ITD between the active-regions of the left and right filters because this would save memory and make the implementation of the filtering operation more efficient. A filter set that has been extracted over the active-region is called a zero-time-delay HR filter set and contains the ITDs between the left and right HR filters in its data representation.

Certain challenges presently exist. For example, it is not trivial to get a good estimation of what constitutes the active-region of each filter, especially if the filters contain pre-ringing effects resulting from the estimation of the filters.

Given that errors exist either from the HR filter measurement process or from a subregion extraction process, in order to guarantee the performance of a binaural audio renderer, it is necessary to detect and correct both types of errors at the HR filters upfront, before using the filters in binaural audio rendering.

Accordingly, in one aspect, there is provided a method for generating a final corrected head-related (HR) filter dataset, $\mathcal{H}_{fc}$. The method includes obtaining a first corrected HR filter dataset, $\mathcal{H}'_I$. Obtaining the first corrected HR filter dataset $\mathcal{H}'_I$ includes obtaining an initial HR filter dataset, $\mathcal{H}_I$, and obtaining an extracted HR filter dataset, $\mathcal{H}_X$, extracted from the initial HR filter dataset, $\mathcal{H}_I$. Obtaining the first corrected HR filter dataset $\mathcal{H}'_I$ further includes obtaining a model, $\mathcal{M}_X$, of the extracted HR filter dataset, $\mathcal{H}_X$ and generating a modelled HR filter dataset, $\mathcal{H}_M$, using the model, $\mathcal{M}_X$. Obtaining the first corrected HR filter dataset $\mathcal{H}'_I$ further includes selecting for correction one or more HR filters that are included in the initial HR filter dataset, $\mathcal{H}_I$, based on the modelled HR filter dataset, $\mathcal{H}_M$, and the extracted HR filter dataset, $\mathcal{H}_X$ and generating the first corrected HR filter dataset, $\mathcal{H}'_I$ by correcting the selected one or more HR filters. Either the final corrected HR filter dataset $\mathcal{H}_{fc}$ is the first corrected HR filter dataset $\mathcal{H}'_I$ or the method further comprises generating the final corrected HR filter set $\mathcal{H}_{fc}$ using the first corrected HR filter dataset $\mathcal{H}'_I$.

In another aspect, there is provided a computer program comprising instructions which when executed by processing circuitry cause the processing circuitry to perform the method described above.

In another aspect, there is provided an apparatus for generating a final corrected head-related (HR) filter dataset, $\mathcal{H}_{fc}$. The apparatus is configured to obtain a first corrected HR filter dataset, $\mathcal{H}'_I$. Obtaining the first corrected HR filter dataset $\mathcal{H}'_I$ includes obtaining an initial HR filter dataset, $\mathcal{H}_I$, and obtaining an extracted HR filter dataset, $\mathcal{H}_X$, extracted from the initial HR filter dataset, $\mathcal{H}_I$. Obtaining the first corrected HR filter dataset $\mathcal{H}'_I$ further includes obtaining a model, $\mathcal{M}_X$, of the extracted HR filter dataset, $\mathcal{H}_X$ and generating a modelled HR filter dataset, $\mathcal{H}_M$, using the model, $\mathcal{M}_X$. Obtaining the first corrected HR filter dataset $\mathcal{H}'_I$ further includes selecting for correction one or more HR filters that are included in the initial HR filter dataset, $\mathcal{H}_I$, based on the modelled HR filter dataset, $\mathcal{H}_M$, and the extracted HR filter dataset, $\mathcal{H}_X$ and generating the first corrected HR filter dataset, $\mathcal{H}'_I$ by correcting the selected one or more HR filters. Either the final corrected HR filter dataset $\mathcal{H}_{fc}$ is the first corrected HR filter dataset $\mathcal{H}'_I$ or the apparatus is further configured to generate the final corrected HR filter set $\mathcal{H}_{fc}$ using the first corrected HR filter dataset $\mathcal{H}'_I$.

In another aspect, there is provided an apparatus. The apparatus comprises a memory; and processing circuitry coupled to the memory, wherein the apparatus is configured to perform the method described above.

Embodiments of this disclosure provide at least the following advantages:

(1) Smoothening out in an HR filter set additive stochastic noise and sporadic errors such as sporadic reflections that are not HR filtering related.

(2) Improving the HR filter set through an iterative process of modeling followed by a process of error detection-classification-correction.

BRIEF DESCRIPTION OF THE DRAWINGS

The accompanying drawings, which are incorporated herein and form part of the specification, illustrate various embodiments.

FIG. 6 shows a process according to one embodiment.

DETAILED DESCRIPTION

Figure 1:
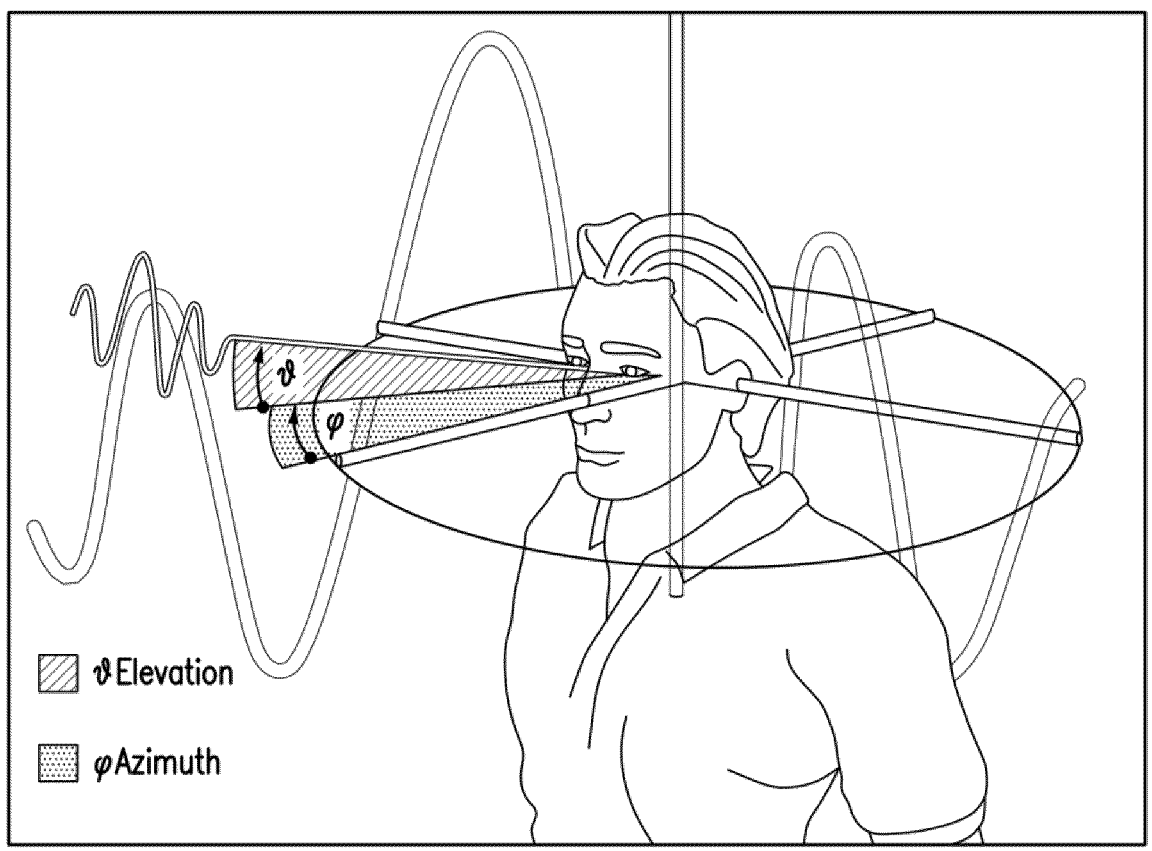
FIG. 1 illustrates a sound wave propagating towards a listener from a direction of arrival (DOA) specified by a pair of elevation and azimuth angles in the spherical coordinate system.
Figure 2:
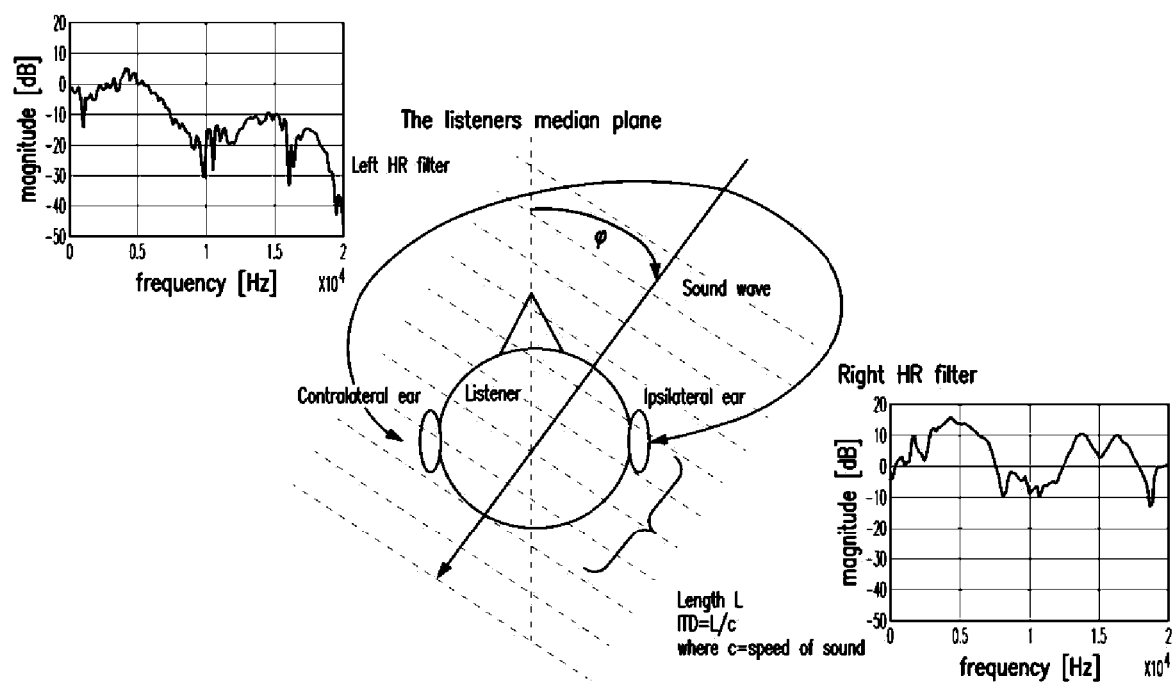
FIG. 2 illustrates an example of ITD and spectral cues of a sound wave propagating towards a listener.
Figure 3:
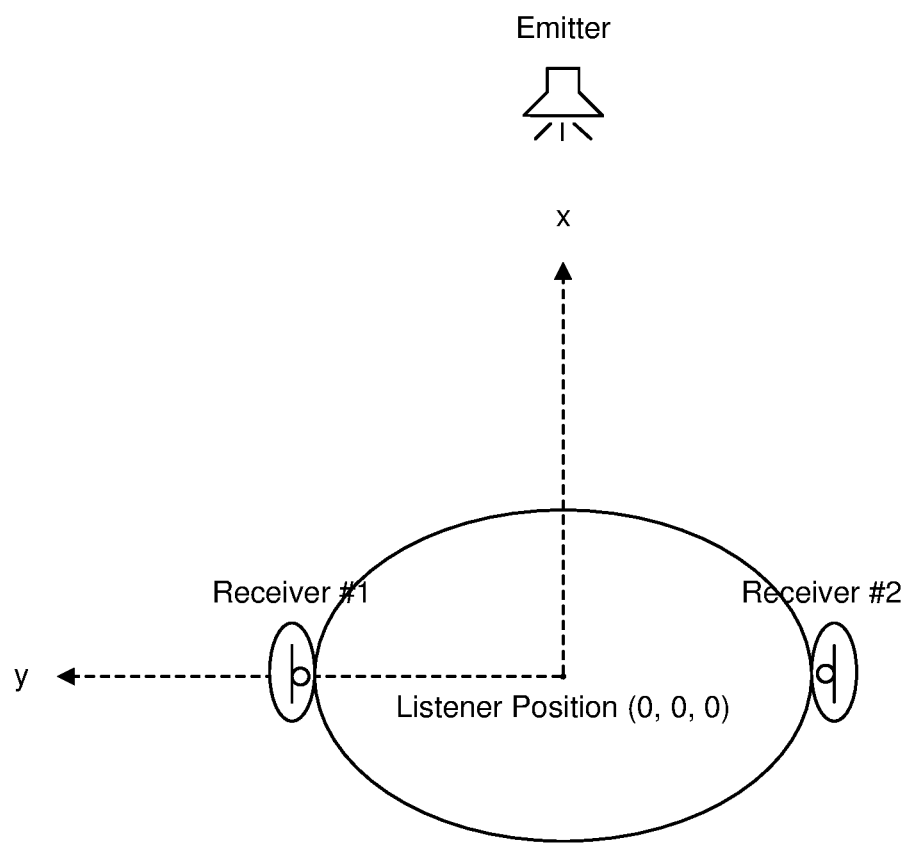
FIG. 3 illustrates a simplified setup for HR filter binaural recording.
Figure 4:
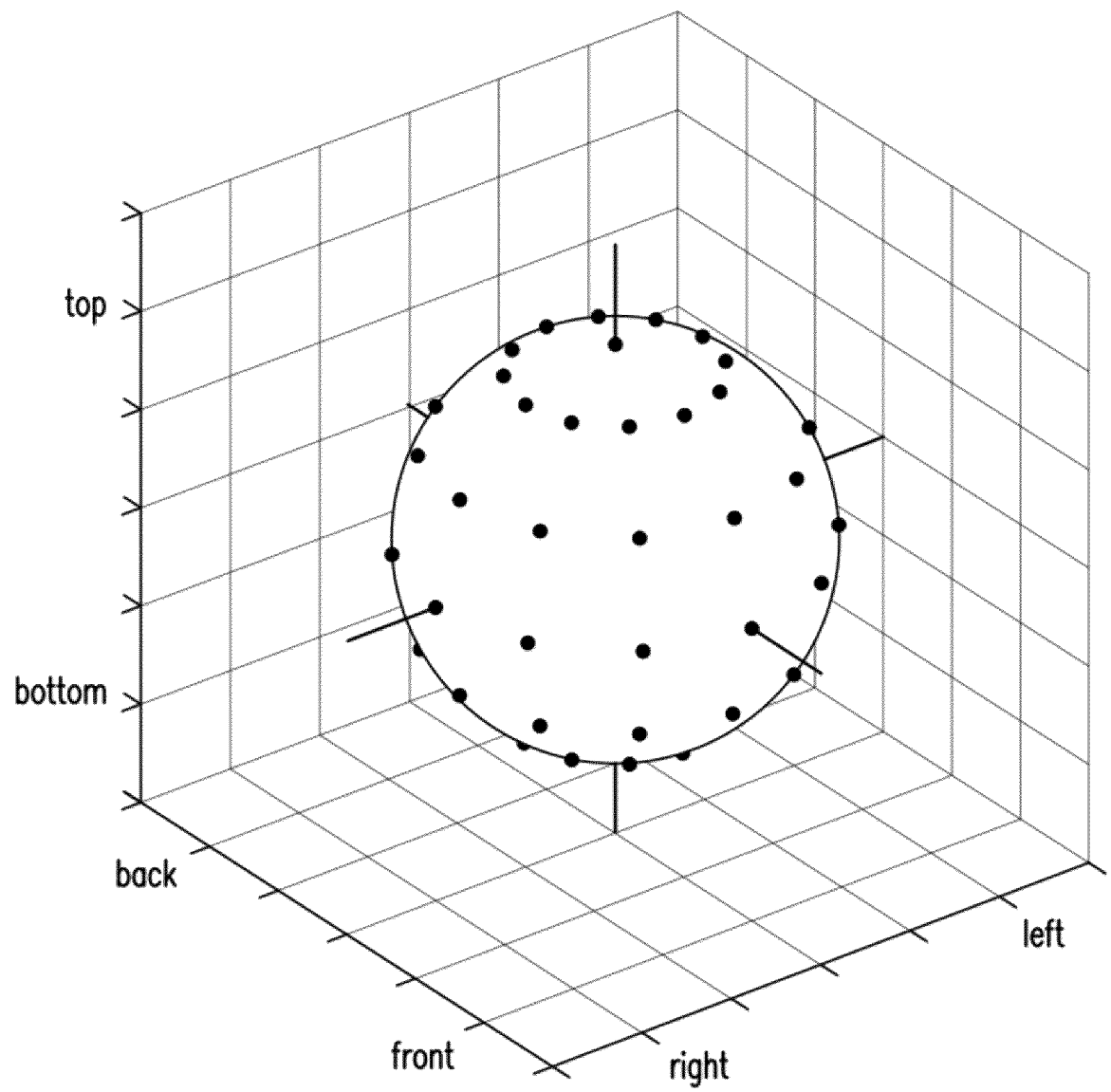
FIG. 4 shows an example of sampling grid on a 2D sphere.

Each left and right HR filter in an HR filter set that is sampled over a set of spherical angles is considered to be the sum of the true HR filter and a measurement/extraction error filter. This applies regardless of whether the HR filter set uses a measured FIR HR filter set directly or uses filters from an HR filter set that has been extracted over different subregions of the temporal span of the filters with ITD values between the left and right filters.

In order to detect and correct errors in the obtained HR filter set, a model of the HR filter set over the unit sphere that forces relatively smooth changes between spatially close HR filters is evaluated. By minimizing the modeling error with respect to the filter set, the model may filter out or remove certain types of measurement/extraction errors in the filters. Examples of the type of errors that may be filtered out or removed include (1) errors in the form of sporadic reflections in the HR filters that are not part of the HR filtering and (2) errors that are additive stochastic noise, especially pronounced in the higher frequencies.

Once the model is obtained, individual HR filters with relatively large modeling errors are identified and the types of the errors are classified. Errors belonging to certain error classes may be corrected. When the errors are correctable, the errors are corrected for those particular HR filters and the set of HR filters is updated with the corrected filters. Iterating this modeling and error detection-classification-correction procedure a few times may produce a much-improved HR filter set. As mentioned above, one class of correctable errors of particular importance is the class of onset delay errors. The class of onset delay errors originate from the measurement process and/or the extraction process, when filters are extracted from subregions of the temporal span of the filters.

The embodiments of this disclosure are applicable to all types of HR filter sets (or filters) including the original HR filter sets and the HR filters which are extracted from different subregions of the temporal span of the filters.

Data Variables and Their Notations

General data structures are denoted as lists of data sequences and other data structures. In the embodiments of this disclosure, a basic HR filter dataset $\mathcal{H}$ is a dataset that contains HR filters sampled at M elevation and azimuth angles $\{(\theta[m], \phi[m]):m=1, \ldots, M\}$, where $\theta$ and $\phi$ are the elevation and azimuth angles respectively and m denotes the index.

The dataset $\mathcal{H}$ may be provided in the form of the data list $\mathcal{H} = \{\theta, \phi, H^l, H^r\}$.

$\theta = \{\theta[m]:m=1, \ldots, M\}$ denotes a sequence of elevation angles.

$\phi = \{\phi[m]:m=1, \ldots, M\}$ denotes a sequence of azimuth angles.

$H^l = \{h^l[m]:m=1, \ldots, M\}$ denotes the set of left HR filters, where $h^l[m] = [h^l[1; m], \ldots, h^l[N^l;m]]$ is an FIR filter of length $N^l$.

$H^r = \{h^r[m]:m=1, \ldots, M\}$ denotes the set of right HR filters, where $h^r[m] = [h^r[1; m], \ldots, h^r[N^r;m]]$ is an FIR filter of length $N^r$.

The length of the left and the right HR filters may be different or the same (i.e., $N^l = N^r$).

In some embodiments, $\mathcal{H}$ may additionally contain data sequences of onset delays that indicate the beginning of the active-region of the filters. For example, the extended HR filter dataset may be $\mathcal{H} = \{\theta, \phi, H^l, H^r, \tau^l, \tau^r\}$, where $\tau^l = \{\tau^l[m]:m=1, \ldots, M\}$ denotes a sequence of onset delays of left HR filters and $\tau^r = \{\tau^r[m]:m=1, \ldots, M\}$ denotes a sequence of onset delays of right HR filters.

$\mathcal{H}$ may also contain a data sequence of ITDs derived from the onset delays of the left and the right HR filters, i.e., $\mathcal{H} = \{\theta, \phi, H^l, H^r, \tau^l, \tau^r, \tau^{ITD}\}$, where $\tau^{ITD} = \{\tau^{ITD[m]}:m=1, \ldots, M\}$ denotes a sequence of ITDs.

In some embodiments, $\mathcal{H}$ may contain a data sequence of ITDs derived from the onset delays of the left and the right HR filters but may not contain a sequence of onset delays of left HR filters and a sequence of onset delays of right HR filters, i.e., $\mathcal{H} = \{\theta, \phi, H^l, H^r, \tau^{ITD}\}$.

In some embodiments of this disclosure, at least four different HR filter datasets may be used—the original dataset $\mathcal{H}_O$, an initial HR filter dataset $\mathcal{H}_I$, an extracted dataset $\mathcal{H}_X$, and a model-generated dataset $\mathcal{H}_M$.

The original dataset $\mathcal{H}_O$ may contain $\{\theta_0, \phi_0, H_0^l, H_0^r\}$. But, in some embodiments, the dataset may additionally contain $\{\tau_0^l, \tau_0^r\}$. In other words, $\mathcal{H}_O$ may be represented as $\mathcal{H}_O = \{\theta_0, \phi_0, H_0^l, H_0^r\}$ or $\{\theta_0, \phi_0, H_0^l, H_0^r, \tau_0^l, \tau_0^r\}$. Also, the original dataset $\mathcal{H}_O$ may or may not include a data sequence of ITDs $\tau^{ITD}$.

The initial HR filter dataset $\mathcal{H}_I$ may be the filter set that is or will be iteratively error corrected. It may be initialized with $\{\theta_0, \phi_0, H_0^l, H_0^r\}$ from $\mathcal{H}_O$—e.g., $\mathcal{H}_I = \{\theta_0, \phi_0, H_0^l, H_0^r\}$. It may also be initialized with an extraction specification that specifies the length of the left and right filters to be extracted ($N_I^l$ and $N_I^r$) and the onset delay sequences for the left and right filters to be used in the extraction ($\tau_I^l$ and $\tau_I^r$). The left and right onset delay sequences $\tau_I^l$ and $\tau_I^r$ can be initialized with:

(1) the onset delay sequences obtained from $\mathcal{H}_O$, when those are available;
(2) left and right onset delay sequences obtained by estimating the onsets of each filter in $H_0^l$ and $H_0^r$; and/or
(3) single sample onset delay sequences $\tau_I^l = \{\tau_I^l[1]\}$ and $\tau_I^r = \{\tau_I^r[1]\}$, where $\tau_I^l[1]$ specifies the desired left onset delay used for all left HR filters and $\tau_I^r[1]$ specifies the desired right onset delay used for all right HR filters. With this option, the filters may be extracted with fixed left and right onset delays. Furthermore, when the original HR filter set is to be extracted, the filter extraction specification for the initial HR filter dataset $\mathcal{H}_I$ becomes $\tau_I^l[1]=1$, $\tau_I^r[1]=1$, $N_I^l=N_0^l$ and $N_I^r=N_0^r$.

As discussed above, $\mathcal{H}_I$ may be represented as $\mathcal{H}_I=\{\theta_0, \phi_0, H_I^l, H_I^r, N_I^l, N_I^r, \tau_I^l, \tau_I^r\}$. During the iterated error correction process, the variables $H_I^l$, $H_I^r$, $\tau_I^l$, $\tau_I^r$ may be updated as needed. Also, as discussed above, the filter extraction specification $X=\{N_I^l, N_I^r, \tau_I^l, \tau_I^r\}$ may be used in the extraction process.

In some embodiments, the extracted HR filter dataset $\mathcal{H}_X$ may be represented as $\mathcal{H}_X=\{\theta_0, \phi_0, H_X^l, H_X^r\}$, where $H_X^l$ and $H_X^r$ are the left and right sequences of filters (filter sets) extracted from $H_I^l$ and $H_I^r$ according to the extraction parameters $N_I^l$, $N_I^r$, $\tau_I^l$, $\tau_I^r$.

For example, $H_X^l=\{h_X^l[m]:m=1,\ldots,M\}$ and $h_X^l[m]=[h_X^l[1;m],\ldots,h_X^l[N_I^l;m]]=[h_I^l[\tau_I^l[m];m],\ldots,h_I^l[\tau_I^l[m]+N_I^l-1;m]]$, where $h_X^l[m]$ is an extracted FIR filter of length $N_I^l$ and $\tau_I^l[m]+N_I^l-1 \leq N_0^l$.

$H_X^r=\{h_X^r[m]:m=1,\ldots,M\}$ and $h_X^r[m]=[h_X^r[1;m],\ldots,h_X^r[N_I^r;m]]=[h_I^r[\tau_I^r[m];m],\ldots,h_I^r[\tau_I^r[m]+N_I^r-1;m]]$, where $h_X^r[m]$ is an extracted FIR filter of length $N_I^r$ and $\tau_I^r[m]+N_I^r-1 \leq N_0^r$.

In the iterated model-based error correction, $\mathcal{H}_X$ may be modelled with model $\mathcal{M}_X$. The model $\mathcal{M}_X$ may be a function of modeling the spatial variation of the filters in the extracted HR filter dataset $\mathcal{H}_X$. Detailed description of the model $\mathcal{M}_X$ is provided below. The model-generated dataset $\mathcal{H}_M$ is a filter set generated by the model $\mathcal{M}_X$ approximating $\mathcal{H}_X$. $\mathcal{H}_M$ may be represented as $\mathcal{H}_M=\{\theta_0, \phi_0, H_M^l, H_M^r\}$. The modeling error between the filters in $\mathcal{H}_X$ and $\mathcal{H}_M$ may be used to detect which filters to classify and to perform error correction on.

When the iterative error correction process stops, the output of the process may be delivered according to an output specification, O as one of the following: (1) a final corrected HR filter dataset (denoted $\mathcal{H}_{fc}$); (2) model $\mathcal{M}'_X$ generated of an extracted HR filter dataset $\mathcal{H}'_X$ which is extracted from the final corrected HR filter dataset ($\mathcal{H}_{fc}$); (3) a new modelled HR filter dataset $\mathcal{H}'_M$ generated from model $\mathcal{M}'_X$ in (2) at the elevation and azimuth angles $\theta$, $\phi$ specified in the output specification, O.

Overview of the Iterative Modeling-Based Error Correction Process

Figure 5:
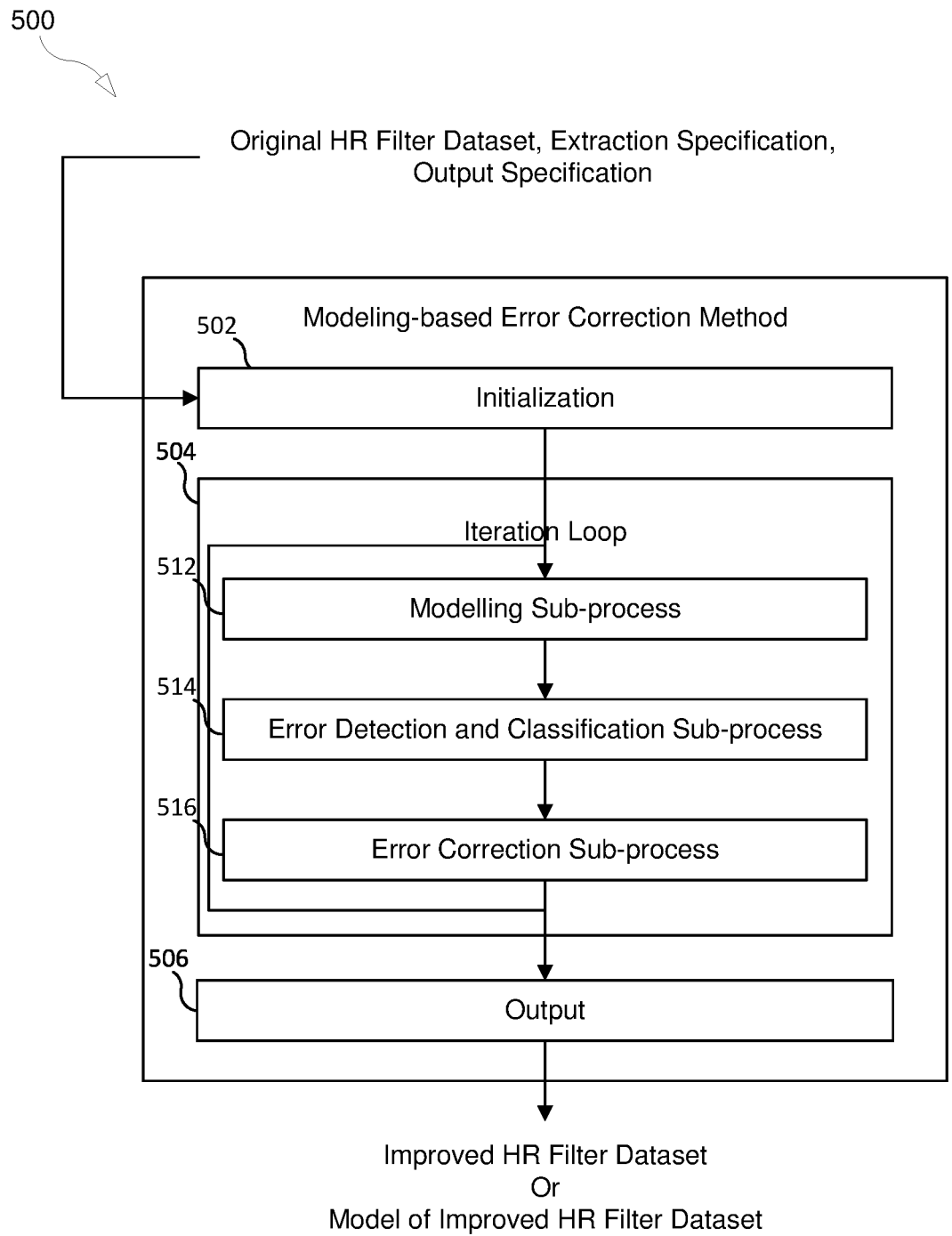
FIG. 5 shows a process according to one embodiment.

FIG. 5 shows an iterative modeling-based error correction method 500 for improving an extracted set of HR filters according to some embodiments.

The inputs of the method 500 may be the original HR filter dataset $\mathcal{H}_0$, the extraction specification X, and the output specification O.

The original HR filter dataset $\mathcal{H}_0$ may be obtained by loading an HR filter dataset from an existing file into $\mathcal{H}_0$.

The extraction specification X may be obtained by specifying the desired values of $X=\{N_I^l, N_I^r, \tau_I^l, \tau_I^r\}$ to use for initializing $\mathcal{H}_I$ and later for the iteration loop extracting $\mathcal{H}_X$ from $\mathcal{H}_I$. As described above, $N_I^l$ and $N_I^r$ define the desired length of the left and right extracted filters, $\tau_I^l$ defines the time instance from where $H_X^l$ is extracted, and $\tau_I^r$ defines the time instance from where $H_X^r$ is extracted.

When the desired extracted HR filter set is the original HR filter set or an HR filter set where the left and right filters are all extracted at the same onset delay, all elements in $\tau_X^l$ and $\tau_X^r$ may be set to have the same value, i.e., $\tau_X^l=\{\tau_X^l[m]=\tau0: m=1,\ldots,M\}$ and $\tau_X^r=\{\tau_X^r[m]=\tau0:m=1,\ldots,M\}$, or they may be defined as sequences of length one as $\tau_X^l=\{\tau_X^l[1]=\tau0\}$ and $\tau_X^r=\{\tau_X^r[1]=\tau0\}$ being used for all the M elevation and azimuth angles.

When the desired extracted HR filter is a zero-time onset delay HR filter set, $\tau_X^l=\{\tau_X^l[m]:m=1,\ldots,M\}$ and $\tau_X^r=\{\tau_X^r[m]:m=1,\ldots,M\}$ with each element corresponding to the onset delay of each HR filter. Some datasets (e.g., the CIPIC dataset) provide onset delay information, which can be used directly as $\tau_X^l$ and $\tau_X^r$. However, most of the datasets do not provide such information. If no such information is provided in the original dataset, an onset delay needs to be estimated for each HR filter. There exist many different methods to do this onset estimation. Example(s) of an onset estimation algorithm are described in PCT/EP2020/079042.

The output specification O may be obtained by specifying the type, denoted by $\mathbb{T}$, of the desired output dataset and, if needed, the sequence of the desired angles $\{\theta_D, \phi_D\}$. $\mathbb{T}$ may indicate if the output dataset is the final corrected HR filter dataset $\mathcal{H}_{fc}$, a model $\mathcal{M}'_X$ of the extracted HR filter dataset $\mathcal{H}'_X$ extracted from the final corrected HR filter dataset $\mathcal{H}_{fc}$, or a new modelled HR filter dataset $\mathcal{H}'_M$ generated from model $\mathcal{M}'_X$. $\{\theta_D, \phi_D\}$ may be obtained directly from $\mathcal{H}_0$ or determined in some other way, e.g., based on a more densely sampled spherical grid, and potentially also based on the model performance, in order to obtain a better rendering quality using the model-generated HR filter dataset.

As discussed above, in the embodiments of this disclosure, the output may be an improved HR filter dataset (i.e., the final corrected HR filter dataset $\mathcal{H}_{fc}$), where the HR filters of the improved HR filter dataset may be stored in the same format as $\mathcal{H}_I$ or may be represented by a model of the improved HR filter dataset or a model-generated HR filter dataset.

After obtaining the inputs discussed above, the iterative modeling-based error correction method 500 may be performed. The method 500 may contain initialization process 502, iteration loop process 504, and outputting process 506.

In some embodiments, iteration loop process 504 may comprise three processes—modeling process 512, model error detection and classification process 514, and HR filter dataset error correction process 516.

The method 500 may be run off-line or inside a binaural audio renderer in connection with loading an HR filter dataset into the renderer.

Details of the Iterative Modeling-Based Error Correction Method 500

1. Initialization Process

In the initialization process 502, some or all data variables needed in the iteration loop are initialized. The data variables needed in the iteration loop may include one or more of: (1) initial HR filter dataset $\mathcal{H}_I$ obtained from the original HR filter dataset $\mathcal{H}_O$ and the extraction specification X; (2) error threshold $\mathcal{T}_\varepsilon$; (3) iteration condition $\mathcal{C}_I$; and (4) list of classifiers $\mathcal{L}_{Classifiers}$.

1.1 Initial HR Filter Dataset $\mathcal{H}_I$

In some embodiments, $\mathcal{H}_I = \{\theta_0, \phi_0, H_I^l, H_I^r, N_I^l, N_I^r, \tau_I^l, \tau_I^r\}$, where $\theta_0, \phi_0, H_I^l, H_I^r$ are initialized with the corresponding data structures in the original HR filter dataset $\mathcal{H}_O$ and $N_I^l, N_I^r, \tau_I^l, \tau_I^r$ are initialized with the corresponding data structures in the extraction specification X.

1.2 Error Threshold $\mathcal{T}_\varepsilon$ $\mathcal{T}_\varepsilon$ may correspond to the threshold value for the modeling errors of the HR filters. The threshold value may be used for the selection of the HR filters to classify. For example, if a modeling error associated with an HR filter is greater than the threshold value, the HR filter may be selected for classification. In one example, the threshold value is 0.10.

1.3 Iteration Condition $\mathcal{C}_I$ $\mathcal{C}_I$ may correspond to the logical expression that controls the iteration loop. The iteration loop may iterate until this logical expression becomes false. The logical expression may be constructed so that it becomes false when there are no more HR filters to correct or when the number of iterations has reached a specified maximum value.

1.4 List of Classifiers $\mathcal{L}_{Classifiers}$ $\mathcal{L}_{Classifiers}$ may be the list of classifiers used to handle the classification of modeling errors and the eventual HR filter correction. Each item in the list may contain one or more of the followings: (1) a classification ID; (2) a classification method for determining if a modeling error is of a particular class or not; and (3) a flag indicating if the classified error can be corrected.

If the classified error can be corrected, the corresponding item may also include a correction method for correcting the classified error when provided with a class specific correction data structure. This class specific correction data structure may be included in the items in a list of classified filters $\mathcal{L}_{classified}$.

2. Iteration Loop Process

In the iteration loop process 504, the following three sub-processes may be repeated until the logical expression $\mathcal{C}_I$ becomes false: (1) modeling sub-process 512; (2) model error detection and classification sub-process 514; and (3) HR filter set error correction sub-process 516.

2.1 Modeling

As shown in FIG. 6, the modeling process 512 may contain three steps—steps s602, s604, and s606.

Step s602, in the first iteration of the iteration loop, comprises obtaining an extracted HR filter dataset $\mathcal{H}_X$ from the initial HR filter dataset $\mathcal{H}_I$. Step s604 comprises obtaining model $\mathcal{M}_X$ of the extracted HR filter dataset $\mathcal{H}_X$. Step s606 comprises obtaining HR filter dataset $\mathcal{H}_M$ generated from the model $\mathcal{M}_X$.

2.1.1 Step s602—Obtaining the extracted HR filter dataset $\mathcal{H}_X$ Step s602 comprises obtaining the extracted HR filter dataset $\mathcal{H}_X$ from the initial HR filter dataset $\alpha_I$. In some embodiments, $\mathcal{H}_X = \{\theta_0, \phi_0, H_X^l, H_X^r\}$, where $\theta_0, \phi_0$ are obtained as the corresponding data structures in $\mathcal{H}_I$, and $H_X^l, H_X^r$ are extracted from $H_I^l, H_I^r$ in $\mathcal{H}_I$ according to the extraction parameters $N_I^l, N_I^r, \tau_I^l, \tau_I^r$ in $\mathcal{H}_I$, where $H_X^l = \{h_X^l[m]: m=1, \ldots, M\}$ and $h_X^l[m] = [h_X^l[1; m], \ldots, h_X^l[N_I^l; m]] = [h_I^l[\tau_I^l[m]; m], \ldots, h_I^l[\tau_I^l[m]+N_I^l-1; m]]$, where $h_X^l[m]$ is an extracted FIR filter of length $N_I^l$.

Similarly, in some embodiments, $H_X^r = \{h_X^r[m]: m=1, \ldots, M\}$ and $h_X^r[m] = [h_X^r[1; m], \ldots, h_X^r[N_I^r; m]] = [h_I^r[\tau_I^r[m]; m], \ldots, h_I^r[\tau[m]+N_I^r-1; m]]$, where $h_X^r[m]$ is an extracted FIR filter of length $N_I^r$.

2.1.2 Step s604—Obtaining the Model $\mathcal{M}_X$

Step s604 comprises obtaining the model $\mathcal{M}_X$ of the extracted HR filter dataset $\mathcal{H}_X$. In some embodiments, the left and right HR filter sets, $H_X^l$ and $H_X^r$, are modelled separately. To simplify notation in this disclosure, the sub- and superscripts will be omitted when they are not specifically needed.

The spatial variation of the filters in HR filter set H may be modelled as a function of elevation and azimuth angles $(\vartheta, \varphi)$. In a general form, the model can be represented by $\hat{h}(\vartheta, \varphi; A, \mathcal{A}) = f(\vartheta, \varphi; A, \mathcal{A})$, where $f$ can be a linear or a non-linear function with A that includes all the model parameters and $\mathcal{A}$ that includes all the basis functions. The basis functions can be learnable or predefined. As an example, for a linear model with P basis functions, this function may be explicitly represented by $\hat{h}(\vartheta, \varphi; A, \mathcal{A}) = \sum_{p=1}^{P} \alpha_p \mathcal{A}_p(\vartheta, \varphi)$, $A = [\alpha_1, \ldots, \alpha_P]$ is the model parameter set where $\alpha_p = [\alpha_1, \ldots, \alpha_N]^T$ is the model parameter vector for the p-th basis function $\mathcal{A}_p(\vartheta, \varphi)$. $[\bullet]^T$ denotes a transpose operator. $\mathcal{A} = \{\zeta_p(\vartheta, \varphi): p=1, \ldots, P\}$ is the sequence of basis functions.

Note that $\vartheta$ and $\varphi$ are used here instead of $\theta$ and $\phi$ to distinguish spatial variables from fixed spatial sampling points. Regardless of whether a linear or nonlinear model is used, the optimal model parameter set $\hat{A}$ can be obtained as the A set that minimizes a loss function of choice L which may include regularization terms, i.e.

$$\hat{A} = \underset{A}{\mathrm{argmin}} \left( L\left( h[m], \hat{h}(\theta[m], \phi[m]; A, \mathcal{A}), A \right) \right),$$

where $\hat{h}(\theta[m], \phi[m]; A, \mathcal{A})$ is the approximation of the HR filter at the sampled angle $(\theta[m], \phi[m])$ given A and $\mathcal{A}$.

One example of such a loss function is a squared error loss, i.e.

$$\hat{A} = \underset{A}{\mathrm{argmin}} \left( \sum_m \left\| h[m] - \hat{h}(\theta[m], \phi[m]; A, \mathcal{A}) \right\|^2 \right).$$

For a linear model, the optimal model parameter set $\hat{A}$ may be obtained through a linear least squares estimation. For a nonlinear model, the optimal model parameter set $\hat{A}$ may be estimated through iterative gradient based methods. Example(s) of a modeling algorithm are described in PCT/EP2020/079042.

The underlying relationship between HR filters and the DOA is normally considered as continuous. However, as discussed above, noise or measurement errors are inevitable in the HR filter measurement process, e.g., a discontinuity appearing in the measurements. In order to avoid overfitting the model to the noise or errors in the HR filter set, two strategies can be applied: 1) carefully designing the basis functions to maximize its smoothness while being rich enough to capture the essential spatial variation of the HR filter; and 2) applying certain regularizations to the loss function to enforce smoothness.

The model representation of the extracted HR filters may be denoted by $\mathcal{M}_{H_X} = \{f, \hat{A}, \mathcal{A}\}$ which contains the optimal model parameter set $\hat{A}$, the basis functions $\mathcal{A}$, and the modeling function $f$ that determines the relationship between $\hat{A}$ and $\mathcal{A}$. Given $\mathcal{M}_{H_X}$, the HR filter vector at angle $(\vartheta, \varphi)$ can be calculated.

If $\mathcal{H}_X$ is a zero-time-delay HR filter dataset, the left onset delay set $\tau_X^l$ and the right onset delay set $\tau_X^r$ or the ITD set $\tau_X^{ITD}$, which is the difference between $\tau_X^l$ and $\tau_X^r$, may also be modelled, separately, as a function of elevation and azimuth angles $(\vartheta, \varphi)$. Similarly, the model of the set of onset delays $\tau$ can be represented by $\hat{\tau}(\vartheta, \varphi; \beta, B) = g(\vartheta, \varphi; \beta, \mathcal{B})$, where g can be a linear or non-linear function with $\beta$ that includes all the model parameters and $\mathcal{B}$ that includes all the basis functions. The basis functions can be learnable or predefined. As an example, for a linear model, this function is given by $\hat{\tau}(\vartheta, \varphi; \beta, \mathcal{B}) = \Sigma_{1-1}^Q \beta_z \mathcal{B}_q(\vartheta, \varphi)$, where $\beta_q$ is the model coefficient of the q-th basis function $\mathcal{B}_q(\vartheta, \varphi)$ and Q is the number of basis functions.

Similar to the HR filters, the optimal model parameter vector $\hat{\beta}$ may be obtained as the vector $\hat{\beta}$ that minimizes a loss function of choice. One example of such a loss function is a squared error loss, i.e.

$$\hat{\beta} = \underset{\beta}{\operatorname{argmin}}\left(\sum_m |\tau[m] - \hat{\tau}(\theta[m], \phi[m]; \beta, \mathcal{B})|^2\right),$$

where $\hat{\tau}(\theta[m], \phi[m]; \beta, \mathcal{B})$ is the approximation of the delay t at the sampled angle $(\theta[m], \phi[m])$ given $\beta$ and $\mathcal{B}$.

The model representation of the delay may be denoted by $\mathcal{M}_\tau = \{g, \hat{\beta}, \mathcal{B}\}$ containing the optimal model parameter vector $\hat{\beta}$, the basis functions $\mathcal{B}$, and the modeling function g that describes the relationship between $\hat{\beta}$ and $\mathcal{B}$.

The model representation of the extracted HR filter dataset $\mathcal{H}_X$, denoted by $\mathcal{M}_X$, may contain the model representations of the left and right HR filters $\mathcal{M}_{H_X}^l$ and $\mathcal{M}_{H_X}^r$. When applicable, $\mathcal{M}_X$ may also contain the model representations of the onset delay of the left and right HR filters $\mathcal{M}_{\tau_X}^l$ and $\mathcal{M}_{\tau_X}^r$ or the model representation of ITD $\mathcal{M}_{\tau_X}^{ITD}$. Inside the iteration loop, the onset delay models may not be needed.

2.1.3 Step s606—Generating HR Filter Model Dataset $\mathcal{H}_M$ Using Model $\mathcal{M}_X$ In step s606, $\mathcal{H}_M$ (e.g., $\{\theta_0, \phi_0, H_M^l, H_M^r, \tau_M^l, \tau_M^r, \tau_M^{ITD}\}$) may be generated using $\mathcal{M}_X$ (e.g., $\{\mathcal{M}_{H_X}^l, \mathcal{M}_{H_X}^r, \mathcal{M}_{\tau_X}^l, \mathcal{M}_{\tau_X}^r, \mathcal{M}_{\tau_X}^{ITD}\}$) at given locations specified by the sequences of sampled angles $\{\theta, \phi\}$, where $\theta = \{\theta[m]: m=1, \ldots, M\}$ and $\phi = \{\phi[m]: m=1, \ldots, M\}$. The sampled angles $\{\theta, \phi\}$ may be obtained directly from $\mathcal{H}_X$ (e.g., $\{\theta_0, \phi_0, H_X^l, H_X^r\}$).

In some embodiments, each of the left HR filters $H_M^l$ (e.g., $\{h_M^l[m]: m=1, \ldots, M\}$) and the right HR filters $H_M^r$ (e.g., $\{h_M^r[m]: m=1, \ldots, M\}$) may be generated from $\mathcal{M}_{H_X}^l$ and $\mathcal{M}_{H_X}^r$ respectively by performing the three steps below.

For each m in $\{1, \ldots, M\}$,
1. Obtain the spherical angles $\theta[m]$ and $\phi[m]$ from the sampled angle sequences $\theta$ and $\phi$.
2. Using the left HR filter set model $\mathcal{M}_{H_X}^l$ in $\mathcal{M}_X$, compute the HR filter vector $h_M^l[m]$ at $(\theta[m], \phi[m])$ using the modeling function $f$, the optimal model parameter set $\hat{A}^l$, and the basis functions $\mathcal{A}$. In the case of a linear model, $h_M^l[m]$ may be calculated by $\Sigma_{p=1}^P \hat{\alpha}_p^l \mathcal{A}_p(\theta[m], \phi[m])$.
3. Using the right HR filter set model $\mathcal{M}_{H_X}^r$ in $\mathcal{M}_X$, compute the HR filter vector $h_M^r[m]$ at $(\theta[m], \phi[m])$ using the modeling function $f$, the optimal model parameter set $\hat{A}^r$, and the basis functions $\mathcal{A}$. In the case of a linear model, $h_M^r[m]$ is calculated by $\Sigma_{p=1}^P \hat{\alpha}_p^r \mathcal{A}_p(\theta[m], \phi[m])$.

Similarly, each of the left onset delays $\tau_M^l$ and the right onset delays $\tau_M^r$ may be generated from $\mathcal{M}_{\tau_X}^l$ and $\mathcal{M}_{\tau_X}^r$ respectively by performing the two steps below. Alternatively, or additionally, ITDs $\tau_M^{ITD}$ may be generated from $\mathcal{M}_{\tau_X}^{ITD}$ by performing the two steps below.

For each m in $\{1, \ldots, M\}$
1. Obtain the spherical angles $\theta[m]$ and $\phi[m]$ from the sampled angle sequences $\theta$ and $\phi$.
2. Using the delay set model $\mathcal{M}_\tau$ in $\mathcal{M}_X$, compute the delay $\tau_M[m]$ at $(\theta[m], \phi[m])$ using the modeling function g, the optimal model parameter $\hat{\beta}$ and the basis functions $\mathcal{B}$. In the case of a linear model, $\tau_M[m]$ may be calculated by $\Sigma_{q=1}^Q \hat{\beta}_q \mathcal{B}_q(\theta[m], \phi[m])$.

The generation of delay datasets is not required in the iteration loop process. In other words, the generation of delay datasets is an optional step in the iteration loop process.

2.2 Model Error Detection and Classification Process

As shown in FIG. 6, the model error detection and classification process 514 may comprise steps s608 and s610.

Step s608 may comprise obtaining a list of indexes of HR filters ($\mathcal{L}_{ToClassify}^l$) to classify. The HR filters to classify have modeling errors exceeding error threshold $\mathcal{T}_\varepsilon$.

Step s610 may comprise obtaining a list of classified HR filters ($\mathcal{L}_{Classified}^h$).

2.2.1 Step s608—Obtaining a List of Indexes of HR Filters to Classify ($\mathcal{L}_{ToClassify}^l$)

The list of indexes of HR filters to classify may be obtained by (1) evaluating the modeling errors of all the HR filters in $\mathcal{H}_M$, (2) finding those modeling errors that exceed the error threshold $\mathcal{T}_\varepsilon$, and (3) putting in the list $\mathcal{L}_{ToClassify}^l$ the indexes of the HR filters having the modeling errors that exceed the error threshold $\mathcal{T}_\varepsilon$. There may be separate index lists for the left and right HR filters.

The evaluation of the modeling errors of all the HR filters in $\mathcal{H}_M$ may be obtained by using the left and right HR filter sequences in $\mathcal{H}_X$ and $\mathcal{H}_M$. For example, the left and right modeling errors may be computed as follows:
(1) Initializing left and right index lists $i^l = []$ and $i^r = []$ that are empty;
(2) For each m in $\{1, \ldots, M\}$, (2-1) Evaluating the left and right modeling errors $e_N^l$ and $e_N^r$. These errors may be evaluated as the normalized modeling errors.

$$e_N^l = \frac{L(h_X^l[m], \hat{h}_M^l(\theta[m], \phi[m]; A, \mathcal{A}))}{f(h_K^l[m])},$$

$$e_N^r = \frac{L(h_X^r[m], \hat{h}_M^r(\theta[m], \phi[m]; A, \mathcal{A}))}{f(h_K^r[m])},$$

where $f$ is the normalization function. As an example, for an L2 loss function, the left and right normalized modeling errors $e_N^l$ and $e_N^r$ are given by $$e_N^l = \frac{\|h_X^l[m] - h_M^l[m]\|^2}{\|h_X^l[m]\|^2},$$

$$e_N^r = \frac{\|h_X^r[m] - h_M^r[m]\|^2}{\|h_X^r[m]\|^2},$$

or some other form of modeling errors.

(2-2) If $e_N^l \geq \mathcal{T}_\varepsilon$, append m to $i^l$ and if $e_N^r \geq \mathcal{T}_\varepsilon$, append m to $i^r$.

(3) Setting $\mathcal{L}_{ToClassify}^l = \{i^l, i^r\}$.

Example) When $H_X^l = \{h_X^l[1], h_X^l[2], h_X^l[3], h_X^l[4], h_X^l[5]\}$ and $H_M^l = \{h_M^l[1], h_M^l[2], h_M^l[3], h_M^l[4], h_M^l[5]\}$ and if each of the errors associated with $h_M^l[1], h_M^l[3], h_M^l[5]$ is greater than $\mathcal{T}_\varepsilon$, then $\mathcal{L}_{ToClassify}^l$ may include the index values of 1, 3, and 5.

2.2.2 Step s610—Obtaining a List of Classified HR Filters ($\mathcal{L}_{Classified}^h$)

The list of classified HR filters ($\mathcal{L}_{Classified}^h$) is a list of classification items, where each classification item may contain any one or more of:

(1) a filter ID with information on the index of a particular HR filter included in the extracted HR filter dataset $\mathcal{H}_X$ and an indication if the particular HR filter is the left or right HR filter;

(2) a classification ID identifying the class of the modeling error associated with the particular HR filter and whether the error of the class is correctable; and (3) a class specific correction data structure with correction information needed by the correction method for that error class.

In the example provided above, $H_X^l = \{h_X^l[1], h_X^l[2], h_X^l[3], h_X^l[4], h_X^l[5]\}$ and $H_M^l = \{h_M^l[1], h_M^l[2], h_M^l[3], h_M^l[4], h_M^l[5]\}$. Also, each of the errors associated with $h_M^l[1], h_M^l[3], h_M^l[5]$ is greater than $\mathcal{T}_\varepsilon$, and $\mathcal{L}_{ToClassify}^l$ includes the index values of 1, 3, and 5.

In the above example, if the error associated with $h_M^l[1]$ belongs to correctable error class #E1, the error associated with $h_M^l[3]$ belongs to non-correctable error class #E2, and the error associated with $h_M^l[5]$ belongs to correctable error class #E3, the list of classified filters ($\mathcal{L}_{Classified}^h$) may include items L1$_{classified}$, L2$_{classified}$, and L3$_{classified}$, wherein L1$_{classified}$ contains L1 filter ID with the information on the index value of [1] and the indication that the HR filter is a left HR filter, L1 classification ID identifying error class #E1 and indicating that #E1 is correctable, and a class specific correction data structure.

Similarly, L2$_{classified}$ contains L2 filter ID with the information on the index value of [3] and the indication that the HR filter is a left HR filter, L2 classification ID identifying error class #E2 and indicating that #E2 is not correctable.

Similarly, L3$_{classified}$ contains L3 filter ID with the information on the index value of [5] and the indication that the HR filter is a left HR filter, L3 classification ID identifying error class #E3 and indicating that #E3 is correctable, and a class specific correction data structure.

For certain classes of HR filter modeling errors, there may be classification methods that can, with a high degree of reliability, determine if the modeling error is of those classes or not. For some of these classes, there may be a method to correct HR filters to fix the errors. The correction methods for different modeling error classes may vary greatly, and thus in some embodiments, those correction methods are provided for the classes.

A list of classifications $\mathcal{L}_{Classifications}$ may be used to manage these classes of modeling errors that can be classified. Each item in that list may contain any one or more of:

(1) a classification ID;

(2) a classification method for determining if the modeling error is of the class or not; and (3) a flag indicating if the classified error can be corrected.

If the extracted HR filter corresponding to the classification ID can be corrected, the item in $\mathcal{L}_{Classifications}$ may also contain a correction method that corrects the extracted HR filter when provided with the class specific correction data structure, typically included in the list of classified HR filters $\mathcal{L}_{Classified}^h$.

One class of particular interest is the class of delay errors. What characterizes a delay error is that the normalized modeling error of the extracted filter is relatively large, but that there exists a shift $\tau_0$, which may be a fractional sample shift, such that when this shift is applied to the corresponding initial HR filter in $\mathcal{H}_I$ this will basically align the extracted HR filter with the corresponding HR filter in $\mathcal{H}_M$ and greatly reduce the normalized modeling error. In the frequency domain, what characterizes a delay error is that the difference in the magnitudes of the extracted and modelled HR filter is small, while the difference of the unwrapped phases of the two HR filters should be close to linear with a slope of $-\tau_0$.

When the method used to classify this kind of modeling error finds a $\tau_0$ satisfying such conditions, it appends a classification item to the list of classified HR filters $\mathcal{L}_{Classified}^h$ with the classification information. The class specific correction data structure for this class in the classification item needs to contain the shift $\tau_0$. Note that for the set of HR filters that go through the classification step it has already been established that their normalized modeling error is above a certain threshold.

Several methods can be used to classify this kind of modeling error. Two embodiments are provided. One in the time domain, the other in the frequency domain. In one embodiment, the following method operating in the time domain is used: Looping over a predetermined sequence of shifts.

This method loops over a predetermined sequence of shifts $\{\tau_k = -\tau_1 + (k-1)\Delta\tau: k=1, \ldots, K\}$ that can be fractional, obtains the shifted extracted HR filter, and evaluates the normalized modeling error of each of those shifted HR filters. The method may also find the shift $\tau_p$ with the least normalized modeling error. If the least normalized modeling error is small enough (controlled by a threshold) it sets $\tau_0 = \tau_p$ and appends a classification item to the list of classified HR filters $\mathcal{L}_{Classified}^{h}$ with the classification information. Fractional shifts may result in greater complexity as they require resampling of the extracted HR filter.

Before presenting the embodiment in the frequency domain, the following notation is needed. Let $F_X$ denote the vector of the Fast Fourier Transform (FFT) of the extracted HR filter $h_X$, for the first ordered w values in the range $0 \le \omega \le \pi$, and $F_M$ denote the same vector for the corresponding modeled filter $h_M$. Let abs($F_X$) be the vector of absolute values of the elements of the $F_X$ vector and abs($F_M$) be the vector of absolute values of the elements of the $F_M$ vector.

In another embodiment, the following method operating in the frequency domain is used. When the normalized norm of the difference vector abs($F_X$)–abs($F_M$) is below a certain threshold, it is clear the large modeling error is due to differences in the angles or phases of the FFTs and that these angle differences are most likely caused by a delay error. In this method the first step is to identify HR filters in the list of HR filters to classify where this condition is satisfied. Once such a HR filter is found, the difference in unwrapped angles/phases, angle($F_X$)–angle($F_M$), is modeled as $-\tau_0\omega$ (a difference in phase caused by a delay error of $\tau_0$) and the $\tau_0$ that minimizes the normalized modeling error, $\hat{\tau}_0$, is obtained. As a final verification before classifying this modeling error as a delay error is it is checked that the modeling error for the corrected extracted filter is below a certain threshold.

2.3 HR Filter Set Error Correction Process

As shown in FIG. 6, in the first iteration of the iteration loop, the HR filter set error correction process 516 may include obtaining a first corrected HR filter dataset $\mathcal{H}'_I$. In some embodiments, $\mathcal{H}'_I$ may be obtained by iterating through the items in the list of classified HR filters $\mathcal{L}_{Classified}^{h}$ and for each item that is correctable, performing the following steps:

(1) Obtaining the filter ID which contains information about the filter index and whether the corresponding HR filter is the left or right HR filter;
(2) Using the obtained filter ID to obtain the HR filter in $\mathcal{H}_I$ to correct;
(3) Obtaining the classification ID and using it to obtain the correction function from the list $\mathcal{L}_{Classifications}$;
(4) Obtaining the class specific correction data structure with the correction information needed by the correction function for that class;
(5) Executing the obtained correction function on the obtained HR filter in $\mathcal{H}_I$ using the obtained class specific correction data structure. This may involve obtaining extra filter data samples from the original HR filter dataset $\mathcal{H}_0$, or extrapolate HR filter data, e.g. by appending zeros, and if needed, update the corresponding onset delay.

After step 516, if the condition Ci is still true, then $\mathcal{H}_I$ is set equal to $\mathcal{H}'_I$ and steps 512, 514, and 516 are repeated.

3. Output Process

As shown in FIG. 6, output process 506 may output one of the following output datasets based on the output specification O. The output specification O may specify the type $\mathbb{T}$ of the desired output dataset and/or the sequence of the desired angles $\{\theta_D, \phi_D\}$.

(1) The final corrected HR filter dataset $\mathcal{H}_{fc}$, where $\mathcal{H}_{fc}$ is the corrected HR filter dataset that was generated the last time step 516 was performed (e.g., if there is only one iteration of the loop, then $\mathcal{H}_{fc} = \mathcal{H}'_I$);
(2) Model $\mathcal{M}'_X$ generated from an extracted HR filter dataset which is extracted from the final corrected HR filter dataset $\mathcal{H}_{fc}$; and
(3) A new modelled HR filter dataset $\mathcal{H}'_M$ generated from model $\mathcal{M}'_X$ at the elevation and azimuth angles $\theta$, $\phi$ specified in the output specification O.

Figure 7A:
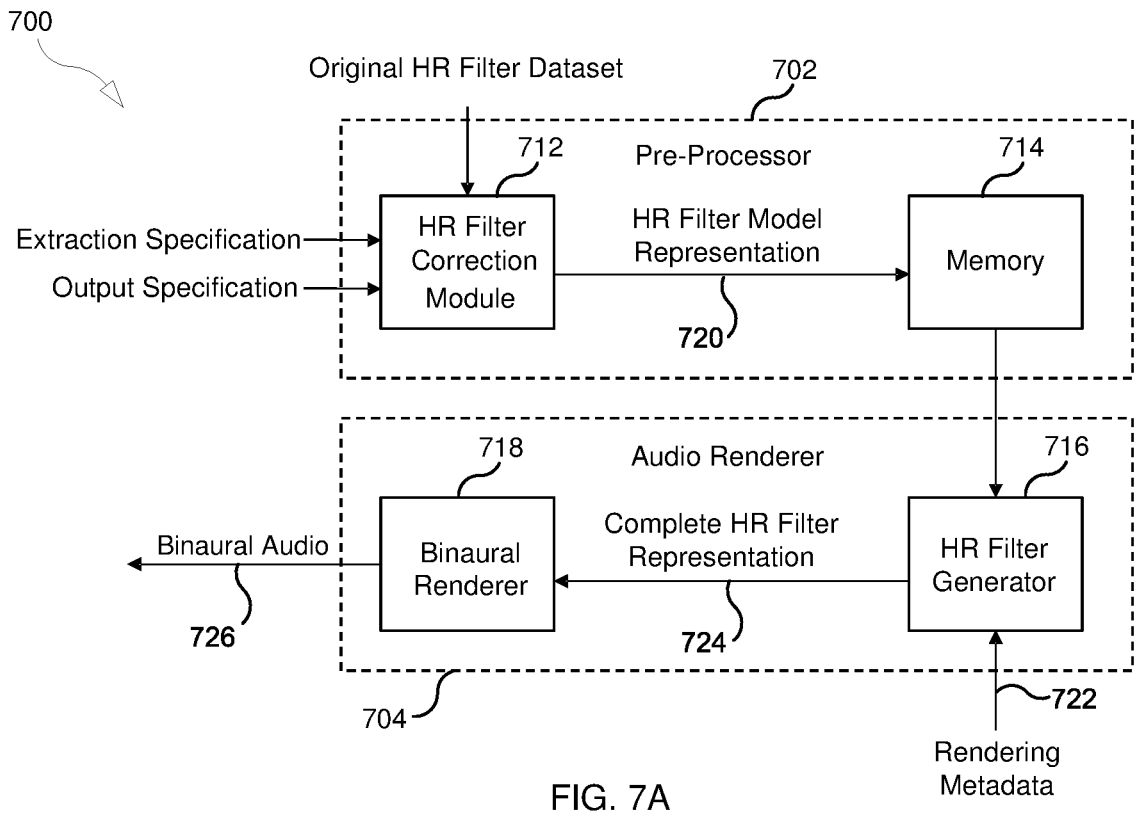
FIGS. 7A and 7B show systems according to some embodiments.

FIG. 7A shows an exemplary system 700 according to some embodiments. The system 700 comprises a pre-processor 702 and an audio renderer 704. The pre-processor 702 and the audio renderer 704 may be included in the same entity or in different entities. Also, different modules (e.g., 712 and 714) included in the pre-processor 702 may be included in the same entity or different entities, and different modules (e.g., 716 and 718) included in the audio renderer 704 may be included in the same entity or different entities.

The pre-processor 702 comprises HR filter correction module 712 and a memory 714. The HR filter correction module 712 may be configured to perform the modeling-based error correction method 500 (shown in FIG. 5) for improving a set of HR filters. Thus, the inputs of the HR filter correction module 712 may be the inputs of the error correction method 500—i.e., the original HR filter dataset $\mathcal{H}_0$, the extraction specification X, and the output specification O. As discussed above, the output of the error correction method 500 may be model $\mathcal{M}'_X$ that represents the final corrected HR filter dataset $\mathcal{H}_{fc}$. Thus, in one embodiment, the HR filter correction module 712 may output HR filter model representation 720 associated with the model $\mathcal{M}'_X$. The outputted HR filter model representation 720 may be stored in the memory 714.

The audio renderer 704 comprises a HR filter generator 716 and a binaural renderer 718. The HR filter generator 716 may read from the memory 714 the HR filter model representation 720, and receive rendering metadata 722. Using the HR filter model representation 720 and the rendering metadata 722, the HR filter generator 716 may generate and output a complete HR filter representation 724. The HR filter representation 724 may correspond to one or more HR filters generated using the HR filter model representation 720 at one or more given spatial angles indicated in the metadata 722. Using the received HR filter representation 724, the binaural renderer 718 may generate binaural audio signals 726.

Figure 7B:
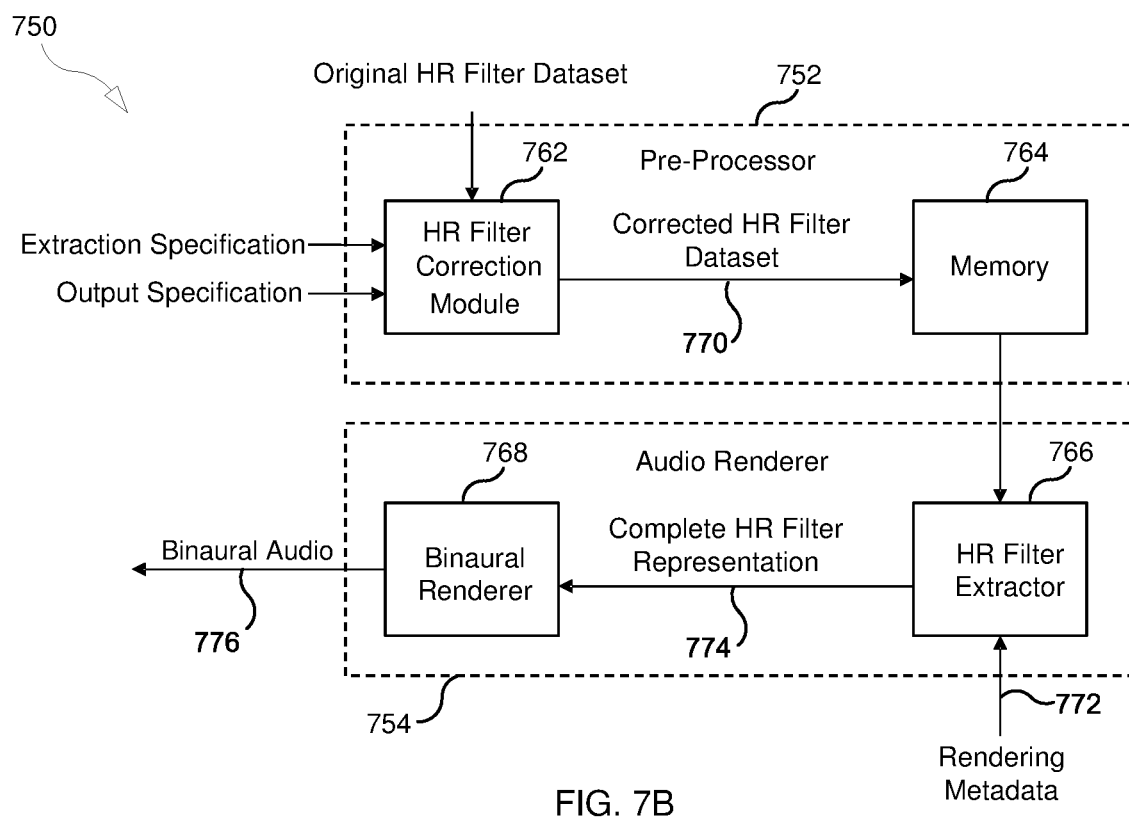

FIG. 7B shows an exemplary system 750 according to some embodiments. The system 750 comprises a pre-processor 752 and an audio renderer 754. The pre-processor 752 and the audio renderer 754 may be included in the same entity or in different entities. Also, different modules (e.g., 762 and 764) included in the pre-processor 752 may be included in the same entity or different entities, and different modules (e.g., 766 and 768) included in the audio renderer 754 may be included in the same entity or different entities.

The pre-processor 752 comprises a HR filter correction module 762 and a memory 764. The HR filter correction module 762 may be configured to perform the modeling-based error correction method 500 (shown in FIG. 5) for improving a set of HR filters. Thus, the inputs of the HR filter correction module 762 may be the inputs of the error correction method 500—i.e., the original HR filter dataset $\mathcal{H}_0$, the extraction specification X, and the output specification O. As discussed above, the output of the error correction method 500 (i.e., the output of the HR filter correction module 762) may be the final corrected HR filter dataset that was generated the last time step s516 was performed. The final corrected HR filter dataset 770 may be stored in the memory 764.

The audio renderer 754 comprises a HR filter extractor 766 and a binaural renderer 768. The HR filter extractor 766 may read from the memory 764 the final corrected HR filter dataset 770, and receive rendering metadata 772. Using the final corrected HR filter dataset 770 and the rendering metadata 772, the HR filter extractor 766 may output a complete HR filter representation 774. The complete HR filter representation 774 may correspond to one or more HR filters obtained (e.g., extracted or interpolated) from the final corrected HR filter dataset 770 at one or more given spatial angles indicated in the metadata 772. Using the received complete HR filter representation 774, the binaural renderer 768 may generate binaural audio signals 776.

Figure 8:
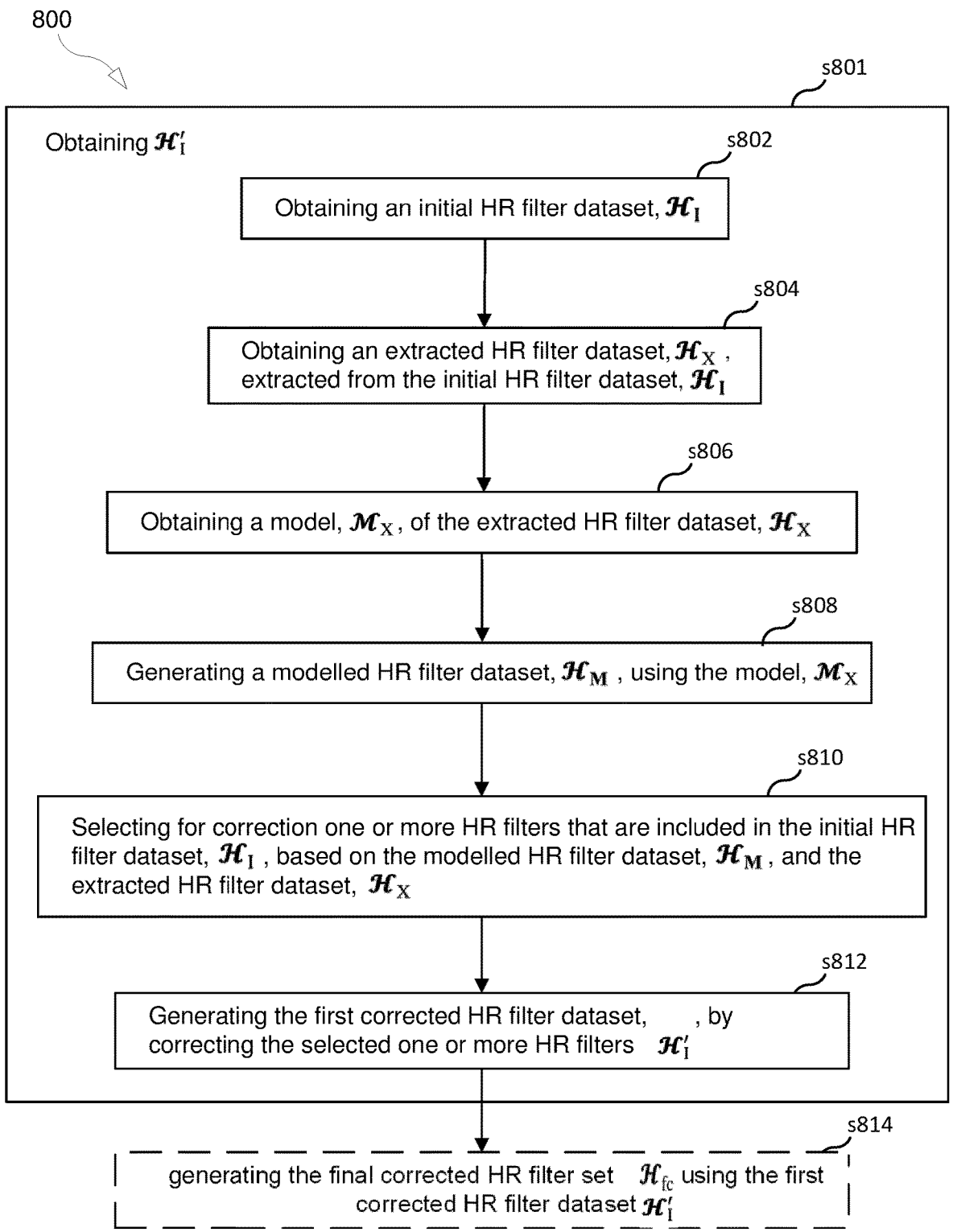
FIG. 8 shows a process according to one embodiment.

FIG. 8 is a process 800 for producing a final corrected head-related (HR) filter dataset, $\mathcal{H}_{fc}$. Process 800 may begin with step s801 comprises obtaining the first corrected HR filter dataset ($\mathcal{H}'_I$). Step s801 comprises steps s802-s812. Step s802 comprises obtaining an initial HR filter dataset, $\mathcal{H}_I$. Step s804 comprises obtaining an extracted HR filter dataset, $\mathcal{H}_X$, extracted from the initial HR filter dataset, $\mathcal{H}_I$. Step s806 comprises obtaining a model, $\mathcal{M}_X$, of the extracted HR filter dataset $\mathcal{H}_X$. Step s808 comprises generating a modelled HR filter dataset, $\mathcal{H}_M$, using the model, $\mathcal{M}_X$. Step s810 comprises selecting for correction one or more HR filters that are included in the initial HR filter dataset, $\mathcal{H}_I$, the initial HR filter dataset. Step s812 generating the first corrected HR filter dataset, $\mathcal{H}'_I$, by correcting the selected one or more HR filters. If a condition is not satisfied (i.e., logical expression $\mathcal{C}$ is TRUE), the process 800 may further include step s814 which comprises generating the final corrected HR filter dataset $\mathcal{H}_{fc}$ using the first corrected HR filter dataset $\mathcal{H}'_I$. If, however, the condition is satisfied, then the final corrected HR filter dataset $\mathcal{H}_{fc}$ is the first corrected HR filter dataset $\mathcal{H}'_I$.

In some embodiments, obtaining the extracted HR filter dataset, $\mathcal{H}_X$, comprises: obtaining a filter extraction specification, X, and obtaining $\mathcal{H}_X$ based on X.

In some embodiments, X comprises a filter length value, N, identifying a filter length, and a set of delay values, τ, identifying the starting point for the extraction.

In some embodiments, obtaining the model comprises modeling a spatial variation of the HR filters included in the extracted HR filter dataset as a function of elevation and azimuth angles.

In some embodiments, the HR filters included in the modelled HR filter dataset are generated by computing an HR filter using the model at each of a plurality of sampled angles.

In some embodiments, selecting for correction the one or more HR filters that are included in the initial HR filter dataset comprises for each HR filter included in $\mathcal{H}_X$, i) calculating an error value for the HR filter based on a corresponding HR filter included in $\mathcal{H}_M$ and ii) determining whether or not to select the HR filter based at least in part on the calculated error value.

In some embodiments, $\mathcal{H}_I$ includes a left initial HR filter set, $H_I^l$, and a right initial HR filter set, $H_I^r$, and $\mathcal{H}_X$ includes a left extracted HR filter set, $\mathcal{H}_X^l$, and a right extracted HR filter set, $H_X^r$. Also, $\mathcal{H}_M$ includes a left modelled HR filter set, $H_M^l$, and a right modelled HR filter set, $H_M^r$. $H_X^l$ includes a plurality of filters $h_X^l[m]$, where m is an index of the HR filters included in $H_X^l$, $1 \leq m \leq M$, and M is a positive integer representing the number of HR filters included in $H_X^l$, and $H_M^l$ includes a plurality of filters $h_M^l[m]$. The error value for each HR filter included in $H_X^l$ may be calculated based on a difference between $h_X^l[m]$ and $h_M^l[m]$ for the corresponding m. $H_X^r$ includes a plurality of filters $h_X^r[m]$, where m is an index of the HR filters included in $H_X^r$, $1 \leq m \leq M$, and M is a positive integer representing the number of HR filters included in $H_X^r$, and $H_M^r$ includes a plurality of filters $h_M^r[m]$. The error value for each HR filter included in $H_X^r$ is calculated based on a difference between $h_X^r[m]$ and $h_M^r[m]$ for the corresponding m.

In some embodiments, the error value for each HR filter included in $H_X^l$ is calculated based on $$\frac{\|h_x^l[m] - h_M^l[m]\|^2}{\|h_x^l[m]\|^2}$$

for the corresponding m and the error value for each HR filter included in $H_X^r$ is calculated based on $$\frac{\|h_x^r[m] - h_M^r[m]\|^2}{\|h_x^r[m]\|^2}$$

for the corresponding m.

In some embodiments, the method further comprises I) comparing the error value for each HR filter included in $H_X^l$ to a threshold value, and for each error value that exceeds the threshold, adding to a filter classification list an HR filter identifier that (i) identifies the HR filter which is associated with the error value and included in $H_X^l$, and (ii) also identifies a corresponding HR filter included in $H_I^l$, wherein the filter classification list identifies filters to classify and II) comparing the error value for each HR filter included in $H_X^r$ to a threshold value and for each error value that exceeds the threshold, adding to a filter classification list an HR filter identifier that (i) identifies the HR filter which is associated with the error value and included in $H_X^r$, and (ii) also identifies a corresponding HR filter included in $H_I^r$, wherein the filter classification list identifies filters to classify.

In some embodiments, the method further comprises finding within the filter classification list one or more HR filter identifiers each of which identifies a correctable HR filter included in either $H_X^l$ or $H_X^r$. The step of selecting for correction the one or more filters that are included in the initial HR filter dataset may comprise selecting for correction one or more HR filters each of which is (i) included in either $H_I^l$ or $H_I^r$ and (ii) identified by the above found one or more HR filter identifiers.

In some embodiments, the method further comprises for each HR filter identified by an HR filter identifier included in the classification list, determining whether the HR filter is correctable, wherein determining whether the HR filter is correctable comprises determining a modeling error class for the HR filter and determining whether the determined modeling error class is correctable.

In some embodiments, the method further comprises as a result of determining that the HR filter is correctable, adding to a correctable list: i) the HR filter identifier that identifies the HR filter and ii) a correction data structure or a pointer to the correction data structure, wherein the correction data structure comprises information for use in correcting the HR filter.

In some embodiments, correcting the selected one or more HR filters comprises finding one or more HR filters each of which is (i) included in either $H_I^I$ or $H_I^r$ and (ii) identified by an HR filter identifier included in the correctable list; and correcting the above found one or more HR filters using the corresponding correction data structure.

In some embodiments, the process includes generating the final corrected HR filter set $\mathcal{H}_{fc}$ using the first corrected HR filter dataset $\mathcal{H}'_I$ (step s814), and generating the final corrected HR filter set $\mathcal{H}_{fc}$ using the first corrected HR filter dataset $\mathcal{H}'_I$ comprises: obtaining a second extracted HR filter dataset from the first corrected HR filter dataset, $\mathcal{H}'_I$; obtaining a second model, of the second extracted HR filter dataset; generating a second modelled HR filter dataset, using the second model; selecting for correction one or more filters that are included in the $H'_I$, based on the second extracted HR filter dataset, and the second modelled HR filter dataset; and generating a second corrected HR filter dataset by correcting the selected one or more HR filters, wherein the method further comprises generating the final corrected HR filter set $\mathcal{H}_{fc}$ using the second corrected HR filter dataset, or the final corrected HR filter dataset $\mathcal{H}_{fc}$ is the second corrected HR filter dataset.

In some embodiments the process further includes outputting any one or more of the followings: (1) the final corrected HR filter dataset, $\mathcal{H}_{fc}$; (2) a model generated from an extracted HR filter dataset which is extracted from the final corrected HR filter dataset $\mathcal{H}_{fc}$; and (3) a new modelled HR filter dataset generated from the model generated in (2). For example, in some embodiments the process includes outputting the final corrected HR filter dataset, $\mathcal{H}_{fc}$ or the model generated from the extracted HR filter dataset which is extracted from the final corrected HR filter dataset $\mathcal{H}_{fc}$.

In some embodiments, $\mathcal{H}_X$ includes an extracted HR filter (e.g., $h_X^I[1]$) and $\mathcal{H}_M$ includes a modelled HR filter (e.g., $h_M^I[1]$). In some embodiments, selecting for correction one or more HR filters that are included in $\mathcal{H}_I$ comprises for each shift included in a set of shifts (e.g., $\tau_1$, $\tau_2$), obtaining a shifted extracted HR filter (e.g., $h_{X\text{-shifted-1}}^I[1]$, $h_{X\text{-shifted-2}}^I[1]$) using the shift (e.g., $\tau_1$, $\tau_2$) and the extracted HR filter (e.g., $h_X^I[1]$) and calculating an error associated with each of the shifted extracted HR filters. The selecting may further comprise among the calculated errors, identifying an error that satisfies a condition; and based on the identified error, classifying an error associated with the extracted HR filter and the modelled HR filter as a class of delay errors that are correctable.

In some embodiments, selecting for correction one or more HR filters that are included in $\mathcal{H}_I$ further comprises finding the shift that was used to obtain the shifted extracted HR filters associated with the minimum error; and using the above found shift as a correction parameter for the class of delay errors.

In some embodiments, the extracted HR filter dataset, $\mathcal{H}_X$, includes an extracted HR filter, the modelled HR filter dataset, $\mathcal{H}_M$, includes a modelled HR filter, and selecting (s810) for correction one or more HR filters that are included in the initial HR filter dataset, $\mathcal{H}_I$, comprises: calculating a measure of the difference of the magnitudes of the extracted HR filter and the modelled HR filter in the frequency domain; comparing the calculated measure to a threshold value to determine whether the calculated measure is less than or equal to the threshold value; and based at least on the comparison, classifying an error associated with the extracted HR filter and the modelled HR filter as a class of delay errors that are correctable.

In some embodiments, selecting (s810) for correction one or more HR filters that are included in the initial HR filter dataset, $\mathcal{H}_I$, further comprises: calculating differences of unwrapped angles and/or phases of the extracted HR filter and the modelled HR filter at sample frequencies; determining a linear model modelling the calculated differences; determining a modelling error based on the calculated differences and values of the linear model at the sample frequencies; comparing the modelling error to an error threshold value; and based at least on the comparison of the modelling error to the error threshold value, using a parameter of the linear model as a correction parameter for the class of delay errors.

In some embodiments, $\mathcal{H}_X$ includes an extracted HR filter (e.g., $h_X^I[1]$) and $\mathcal{H}_M$ includes a modelled HR filter (e.g., $h_M^I[1]$). In some embodiments, selecting for correction one or more HR filters that are included in $\mathcal{H}_I$ comprises calculating a difference of phases of the extracted HR filter and the modelled HR filter and for each shift included in a set of shifts (e.g., $\tau_1$, $\tau_2$), calculating an error between the calculated difference of phases and a comparing value (e.g., $-\tau_0\omega$) that is calculated based on the shift. The selecting may further comprise among the calculated errors, identifying the minimum error; and based on the minimum error, classifying an error associated with the extracted HR filter and the modelled HR filter as a class of delay errors that are correctable.

In some embodiments, selecting for correction one or more HR filters that are included in $\mathcal{H}_I$ further comprises finding the shift that was used to calculate the comparing value resulted in the minimum error; and using the above found shift as a correction parameter in a class specific correction data structure for the class of delay errors.

In some embodiments, the filter classification list comprises an indicator indicating whether said one or more HR filter identifiers is associated with $H_X^I$ or $H_X^r$.

In some embodiments, identifying the error that satisfies the condition comprises identifying the minimum error among the calculated errors.

Figure 9:
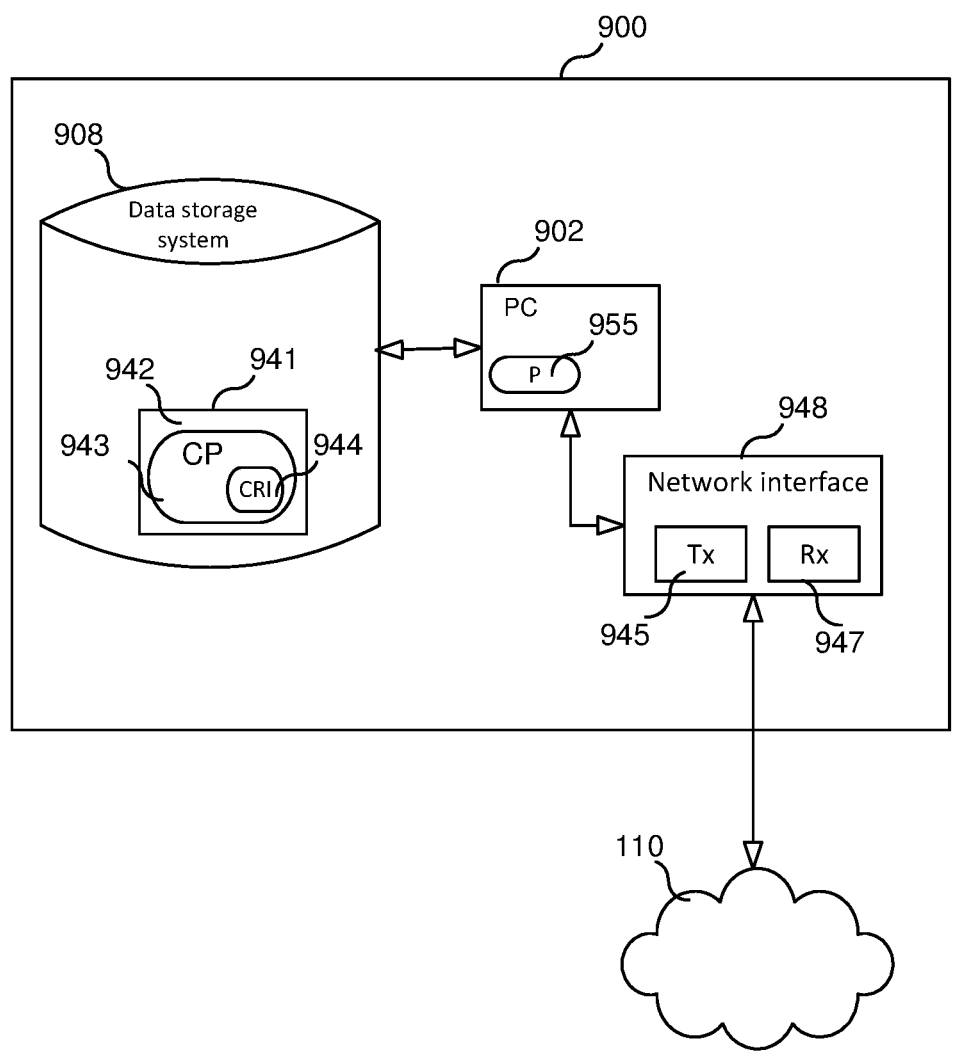
FIG. 9 shows an apparatus according to one embodiment.

FIG. 9 is a block diagram of an apparatus 900, according to some embodiments, for implementing the pre-processor 702 or 752 shown in FIGS. 7a and 7b. As described above, the pre-processor 702 or 752 may include the HR filter correction module 712 or 762 that can be configured to perform the HR filter correction described herein. As shown in FIG. 9, apparatus 900 may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 900 may be a distributed computing apparatus); at least one network interface 948, each network interface 948 comprises a transmitter (Tx) 945 and a receiver (Rx) 947 for enabling apparatus 900 to transmit data to and receive data from other nodes connected to a network 110 (e.g., an Internet Protocol (IP) network) to which network interface 948 is connected (directly or indirectly) (e.g., network interface 948 may be wirelessly connected to the network 110, in which case network interface 948 is connected to an antenna arrangement); and one or more storage units (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes apparatus 900 to perform steps described herein (e.g., steps described herein with reference to the flow charts). In other embodiments, apparatus 900 may be configured to perform steps described herein without the need for code. That is, for example, PC 902 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes and message flows described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for generating a final corrected head-related, HR, filter dataset, $\mathcal{H}_{fc}$, the method comprising:
obtaining a first corrected HR filter dataset, $\mathcal{H}'_I$, wherein the obtaining comprises:
obtaining an initial HR filter dataset, $\mathcal{H}_I$;
obtaining an extracted HR filter dataset, $\mathcal{H}_X$, extracted from the initial HR filter dataset, $\mathcal{H}_I$;
obtaining a model, $\mathcal{M}_X$, of the extracted HR filter dataset, $\mathcal{H}_X$;
generating a modelled HR filter dataset, $\mathcal{H}_M$, using the model, $\mathcal{M}_X$;
selecting for correction one or more HR filters that are included in the initial HR filter dataset, $\mathcal{H}_I$, based on the modelled HR filter dataset, $\mathcal{H}_M$, and the extracted HR filter dataset, $\mathcal{H}_X$; and generating the first corrected HR filter dataset, $\mathcal{H}'_I$, by correcting the selected one or more HR filters, wherein the method further comprises generating the final corrected HR filter set $\mathcal{H}_{fc}$ using the first corrected HR filter dataset $\mathcal{H}'_I$, or the final corrected HR filter dataset $\mathcal{H}_{fc}$ is the first corrected HR filter dataset $\mathcal{H}'_I$.

2. The method of claim 1, wherein obtaining the extracted HR filter dataset, $\mathcal{H}_X$, comprises obtaining a filter extraction specification, X, and obtaining the extracted HR filter dataset, $\mathcal{H}_X$ based on X.

3. The method of claim 2, wherein X comprises a filter length value, N, identifying a filter length, and a set of delay values, $\tau$, identifying the starting point for the extraction.

4. The method of claim 1, wherein obtaining the model, $\mathcal{M}_X$, comprises modeling a spatial variation of the HR filters included in the extracted HR filter dataset, $\mathcal{H}_X$, as a function of elevation and azimuth angles.

5. The method of claim 1, wherein the HR filters included in the modelled HR filter dataset, $\mathcal{H}_M$, are generated by computing an HR filter using the model, $\mathcal{M}_X$, at each of a plurality of sampled angles.

6. The method of claim 1, wherein selecting for correction the one or more HR filters that are included in the initial HR filter dataset, $\mathcal{H}_I$ comprises:
for each HR filter included in the extracted HR filter dataset, $\mathcal{H}_X$, i) calculating an error value for the HR filter based on a corresponding HR filter included in the modelled HR filter dataset, $\mathcal{H}_M$ and ii) determining whether or not to select the HR filter based at least in part on the calculated error value.

7. The method of claim 6, wherein
the initial HR filter dataset, $\mathcal{H}_I$ includes a left initial HR filter set, $H_I^l$, and a right initial HR filter set, $H_I^r$,
the extracted HR filter dataset, $\mathcal{H}_X$ includes a left extracted HR filter set, $H_X^l$, and a right extracted HR filter set, $H_X^r$,
the modelled HR filter dataset, $\mathcal{H}_M$ includes a left modelled HR filter set, $H_M^l$, and a right modelled HR filter set, $H_M^r$,
the left extracted HR filter set, $H_X^l$ includes a plurality of filters $h_X^l[m]$, where m is an index of the HR filters included in the left extracted HR filter set, $H_X^l$, $1 \le m \le M$, and M is a positive integer representing the number of HR filters included in the left extracted HR filter set, $H_X^l$,
the left modelled HR filter set, $H_M^l$ includes a plurality of filters $h_M^l[m]$, and
the error value for each HR filter included in the left extracted HR filter set, $H_X^l$ is calculated based on a difference between $h_X^l[m]$ and $h_M^l[m]$ for the corresponding m,
the right extracted HR filter set, $H_X^r$ includes a plurality of filters $h_X^r[m]$, where m is an index of the HR filters included in the right extracted HR filter set, $H_X^r$, $1 \le m \le M$, and M is a positive integer representing the number of HR filters included in the right extracted HR filter set, $H_X^r$,
the right modelled HR filter set, $H_M^r$ includes a plurality of filters $h_M^r[m]$, and the error value for each HR filter included in the right extracted HR filter set, $H_X^r$ is calculated based on a difference between $h_X^r[m]$ and $h_M^r[m]$ for the corresponding m.

8. The method of claim 7, wherein
the error value for each HR filter included in the left extracted HR filter set, $H_X^l$ is calculated based on:

$$\frac{\|h_x^l[m] - h_M^l[m]\|^2}{\|h_x^l[m]\|^2}$$

and the error value for each HR filter included in the right extracted HR filter set, $H_X^r$ is calculated based on:

$$\frac{\|h_x^r[m] - h_M^r[m]\|^2}{\|h_x^r[m]\|^2}.$$

9. The method of claim 7, the method further comprising:
comparing the error value for each HR filter included in the left extracted HR filter set, $H_X^l$ to a threshold value;
for each error value that exceeds the threshold value, adding to a first filter classification list an HR filter identifier that (i) identifies the HR filter which is associated with the error value and included in the left extracted HR filter set, $H_X^l$, and (ii) also identifies a corresponding HR filter included in the left initial HR filter set, $H_I^l$, wherein the first filter classification list identifies filters to classify;
comparing the error value for each HR filter included in the right extracted HR filter set, $H_X^r$ to a threshold value;
for each error value that exceeds the threshold, adding to a second filter classification list an HR filter identifier that (i) identifies the HR filter which is associated with the error value and included in the right extracted HR filter set, $H_X^r$, and (ii) also identifies a corresponding HR filter included in the right initial HR filter set, $H_I^r$, wherein the second filter classification list identifies filters to classify, and further wherein the first and second filter classification lists are the same or different.

10. The method of claim 9, the method further comprising:
finding within the first or second filter classification lists one or more HR filter identifiers each of which identifies a correctable HR filter included in either the left extracted HR filter set, $H_X^l$, or the right extracted HR filter set, $H_X^r$, wherein
the step of selecting for correction the one or more filters that are included in the initial HR filter dataset comprises selecting for correction one or more HR filters each of which is (i) included in either the left initial HR filter set, $H_I^l$ or the right initial HR filter set, $H_I^r$ and (ii) identified by the above found one or more HR filter identifiers.

11. The method of claim 10, wherein the filter classification list comprises an indicator indicating whether said one or more HR filter identifiers is associated with the left extracted HR filter set, $H_X^l$, or the right extracted HR filter set, $H_X^r$.

12. The method of claim 9, the method further comprising:
for each HR filter identified by an HR filter identifier included in the first or second filter classification list, determining whether the HR filter is correctable, wherein
determining whether the HR filter is correctable comprises determining a modeling error class for the HR filter and determining whether the determined modeling error class is correctable.

13. The method of claim 12, further comprising:
as a result of determining that the HR filter is correctable, adding to a correctable list: i) the HR filter identifier that identifies the HR filter and ii) a correction data structure or a pointer to the correction data structure, wherein the correction data structure comprises information for use in correcting the HR filter.

14. The method of claim 13, wherein correcting the selected one or more HR filters comprises:
finding one or more HR filters each of which is (i) included in either the left initial HR filter set, $H_I^l$ or the right initial HR filter set, $H_I^r$ and (ii) identified by an HR filter identifier included in the correctable list; and
correcting the above found one or more HR filters using the corresponding correction data structure.

15. The method of claim 1, wherein
the method further comprises generating the final corrected HR filter set $\mathcal{H}_{fc}$ using the first corrected HR filter dataset $\mathcal{H}'_f$, and
generating the final corrected HR filter set $\mathcal{H}_{fc}$ using the first corrected HR filter dataset $\mathcal{H}'_f$ comprises:
obtaining a second extracted HR filter dataset, from the first corrected HR filter dataset, $\mathcal{H}'_f$;
obtaining a second model of the second extracted HR filter dataset;
generating a second modelled HR filter dataset using the second model;
selecting for correction one or more filters that are included in the $\mathcal{H}'_f$, based on the second extracted HR filter dataset and the second modelled HR filter dataset; and
generating a second corrected HR filter dataset by correcting the selected one or more HR filters, wherein
the method further comprises generating the final corrected HR filter set $\mathcal{H}_{fc}$ using the second corrected HR filter dataset, or
the final corrected HR filter dataset $\mathcal{H}_{fc}$ is the second corrected HR filter dataset.

16. The method of claim 1, the method further comprising:
outputting any one or more of the followings: (1) the final corrected HR filter dataset, $\mathcal{H}_{fc}$; (2) a model generated from an extracted HR filter dataset which is extracted from the final corrected HR filter dataset $\mathcal{H}_{fc}$; and (3) a new modelled HR filter dataset generated from the model generated in (2).

17. The method of claim 16, wherein the method includes outputting the final corrected HR filter dataset, $\mathcal{H}_{fc}$ or the model generated from the extracted HR filter dataset which is extracted from the final corrected HR filter dataset $\mathcal{H}_{fc}$.

18. The method of claim 1, wherein
the extracted HR filter dataset, $\mathcal{H}_X$, includes an extracted HR filter, the modelled HR filter dataset, $\mathcal{H}_M$, includes a modelled HR filter, selecting for correction one or more HR filters that are included in the initial HR filter dataset, $\mathcal{H}_I$, comprises:
  obtaining a set of time shifts
    for each time shift included in the set of time shifts, obtaining a shifted extracted HR filter using the time shift and the extracted HR filter;
  calculating an error associated with each of the shifted extracted HR filters;
  among the calculated errors, identifying an error that satisfies a condition; and
  based on the identified error, classifying an error associated with an extracted HR filter and a modelled HR filter as a class of delay errors that are correctable.

19. The method of claim 18, wherein selecting for correction one or more HR filters that are included in the initial HR filter dataset, $\mathcal{H}_I$, further comprises:
  finding the time shift that was used to obtain the shifted extracted HR filters associated with the identified error that satisfies the condition; and
  using the above found time shift as a correction parameter for the class of delay errors.

20. The method of claim 18, wherein identifying the error that satisfies the condition comprises identifying the minimum error among the calculated errors.

21. The method of claim 1, wherein
  the extracted HR filter dataset, $\mathcal{H}_X$, includes an extracted HR filter,
  the modelled HR filter dataset, $\mathcal{H}_M$, includes a modelled HR filter, and
  selecting for correction one or more HR filters that are included in the initial HR filter dataset, $\mathcal{H}_I$, comprises:
  calculating a measure of the difference of the magnitudes of the extracted HR filter and the modelled HR filter in the frequency domain;
  comparing the calculated measure to a threshold value to determine whether the calculated measure is less than or equal to the threshold value; and
  based at least on the comparison, classifying an error associated with the extracted HR filter and the modelled HR filter as a class of delay errors that are correctable.

22. The method of claim 21, wherein selecting for correction one or more HR filters that are included in the initial HR filter dataset, $\mathcal{H}_I$, further comprises:
  calculating differences of unwrapped angles and/or phases of the extracted HR filter and the modelled HR filter at sample frequencies;
  determining a linear model modelling the calculated differences;
  determining a modelling error based on the calculated differences and values of the linear model at the sample frequencies,
  comparing the modelling error to an error threshold value; and
  based at least on the comparison of the modelling error to the error threshold value, using a parameter of the linear model as a correction parameter for the class of delay errors.

23. An apparatus comprising:
  a memory; and
  processing circuitry coupled to the memory, wherein the apparatus is configured to perform:
  obtaining a first corrected HR filter dataset, $\mathcal{H}'_I$, wherein the obtaining comprises:
    obtaining an initial HR filter dataset, $\mathcal{H}_I$;
    obtaining an extracted HR filter dataset, $\mathcal{H}_X$, extracted from the initial HR filter dataset, $\mathcal{H}_I$;
    obtaining a model, $\mathcal{M}_X$, of the extracted HR filter dataset, $\mathcal{H}_X$;
    generating a modelled HR filter dataset, $\mathcal{H}_M$, using the model, $\mathcal{M}_X$;
    selecting for correction one or more HR filters that are included in the initial HR filter dataset, $\mathcal{H}_I$, based on the modelled HR filter dataset, $\mathcal{H}_M$, and the extracted HR filter dataset, $\mathcal{H}_X$; and
    generating the first corrected HR filter dataset, $\mathcal{H}'_I$ by correcting the selected one or more HR filters, wherein
  the apparatus is further configured to generate the final corrected HR filter set $\mathcal{H}_{fc}$ using the first corrected HR filter dataset $\mathcal{H}'_I$, or
  the final corrected HR filter dataset $\mathcal{H}_{fc}$ is the first corrected HR filter dataset $\mathcal{H}'_I$.

* * * * *